(12) United States Patent
Mochizuki

(10) Patent No.: US 10,759,320 B2
(45) Date of Patent: Sep. 1, 2020

(54) VEHICLE SEAT

(71) Applicant: TS TECH CO., LTD., Asaka-shi, Saitama (JP)

(72) Inventor: Haruki Mochizuki, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 63 days.

(21) Appl. No.: 15/741,555

(22) PCT Filed: Jul. 1, 2016

(86) PCT No.: PCT/JP2016/069619
§ 371 (c)(1),
(2) Date: Jan. 3, 2018

(87) PCT Pub. No.: WO2017/006858
PCT Pub. Date: Jan. 12, 2017

(65) Prior Publication Data
US 2018/0194255 A1 Jul. 12, 2018

(30) Foreign Application Priority Data
Jul. 3, 2015 (JP) .................................. 2015-134710

(51) Int. Cl.
*A47C 31/12* (2006.01)
*G06F 7/00* (2006.01)
(Continued)

(52) U.S. Cl.
CPC ................. *B60N 2/99* (2018.02); *B60N 2/02* (2013.01); *B60N 2/0244* (2013.01); *B60N 2002/0268* (2013.01)

(58) Field of Classification Search
None
See application file for complete search history.

(56) References Cited

U.S. PATENT DOCUMENTS 5,419,614 A * 5/1995 Richards ................... B60N 2/62
297/284.11
6,039,402 A * 3/2000 Nemoto ................... B60N 2/02
296/65.05
(Continued)

FOREIGN PATENT DOCUMENTS

JP S61-057435 A 3/1986
JP H01-113027 U 7/1989
(Continued)

*Primary Examiner* — Adam D Tissot
*Assistant Examiner* — Laura E Linhardt
(74) *Attorney, Agent, or Firm* — Faegre Drinker Biddle & Reath LLP

(57) ABSTRACT

A vehicle seat is provided with a side support device configured to assist vehicle exit behavior of an occupant while stably securing a holding property for the sitting occupant. The vehicle seat includes a side support device configured to support a cushion side portion of a seat cushion to be switchable between a seating available position and a vehicle exit assist position, a lock device configured to lock the cushion side portion in the seating available position, and a lock release device configured to release a lock state of the lock device. The lock release device includes a first lever configured to detect sitting of the occupant on a cushion center portion and a second lever configured to detect sitting of the occupant on the cushion side portion. The lock state is released when the detection by the second lever occurs while the detection by the first lever continues.

15 Claims, 20 Drawing Sheets

(51) Int. Cl.
*B60N 2/00* (2006.01)
*B60N 2/02* (2006.01)
*G01G 19/414* (2006.01)
*A47C 7/00* (2006.01)
*B60N 2/90* (2018.01)

(56) References Cited

U.S. PATENT DOCUMENTS

| | | | | |
|---|---|---|---|---|
| 6,246,936 | B1 * | 6/2001 | Murphy | G01G 19/4142 |
| | | | | 280/735 |
| 6,659,553 | B2 * | 12/2003 | Achleitner | B60N 2/646 |
| | | | | 297/284.9 |
| 7,168,738 | B2 * | 1/2007 | Garcia, Jr. | B60N 2/002 |
| | | | | 180/268 |
| 8,126,615 | B2 * | 2/2012 | McMillen | B60N 2/0232 |
| | | | | 701/49 |
| 8,948,962 | B2 * | 2/2015 | Pywell | B60N 2/0228 |
| | | | | 297/378.12 |
| 2007/0118259 | A1 * | 5/2007 | Chernoff | B60N 2/002 |
| | | | | 701/36 |
| 2008/0122272 | A1 * | 5/2008 | Aoki | B60N 2/986 |
| | | | | 297/217.2 |
| 2019/0084447 | A1 * | 3/2019 | Lee | B60N 2/0244 |

FOREIGN PATENT DOCUMENTS

| | | |
|---|---|---|
| JP | H07-163439 A | 6/1995 |
| JP | 2004-236943 A | 8/2004 |
| JP | 2007-282746 A | 11/2007 |
| JP | 2008-012930 A | 1/2008 |

* cited by examiner

VEHICLE SEAT

CROSS REFERENCE TO RELATED APPLICATIONS

This application is a National Stage Entry application of PCT Application No. PCT/JP2016/069619, filed Jul. 1, 2016, which claims the priority benefit of Japanese Patent Application No. JP 2015-134710, filed Jul. 3, 2015, the contents being incorporated herein by reference.

BACKGROUND

The present disclosure relates to a vehicle seat, and more particularly to a vehicle seat including a side support device that assists a vehicle exit movement of an occupant.

Hitherto, there is known a vehicle seat including a side support device that supports a side portion, which is in a seat widthwise direction in a seat cushion on which an occupant can seat, to be movable between a standing position provided so that a sitting surface is protruded from a center portion in the seat widthwise direction and a vehicle exit assist position provided so that the sitting surface is recessed from the center portion. When the side portion of the seat cushion is supported in the standing position by the side support device, a holding property for the occupant can be increased when the occupant is sitting. Then, when the side portion is supported in the vehicle exit assist position, a load imposed on the occupant who is moving over the side portion can be decreased when the occupant opens a door of the vehicle for entry/exit.

For example, a vehicle seat provided with an entry/exit support device described in Japanese Patent Publication JP S61-57435A includes i) a side frame that supports a side portion of a seat cushion to be movable between a standing position and a lowered position and ii) a lock mechanism that locks the side frame when a sitting load of an occupant is imposed on a center portion of the seat cushion. Specifically, the lock mechanism is configured to lock the side portion in the standing position when the occupant is sitting on a seat main body, and release the lock of the side frame when the occupant stands up for the entry/exit.

Moreover, a vehicle seat including an entry/exit support device described in Japanese Patent Publication JP 2007-282746A includes a cushion holder that supports a side support cushion to be movable between a standing position and an inclined position, a standing hold device that holds the cushion holder in the standing position, and a standing hold release device that release a standing hold state of the cushion holder, thereby moving the cushion holder from the standing position to the inclined position. Specifically, when the vehicle door is opened for the occupant to enter/exit, the standing hold state of the cushion holder is released, and when the vehicle door is closed after the occupant enters/exits, the cushion holder is returned to the standing hold state.

Moreover, a vehicle seat including an entry/exit support device described in Japanese Patent Publication JP H7-163439A includes a seat deflection sensor that detects a state where an occupant is sitting on a seat main body, a door switch that detects an opening/closing operation of a vehicle door by the occupant, a belt fastening switch that detects a state where the occupant has fastened a seat belt, and the like, for example. Further, this vehicle seat includes a control device that receives information from the various sensors and the various switches, and controls an operation of the entry/exit support device.

Incidentally, each of the entry/exit support devices described in JP S61-57435A, JP 2007-282746A, JP H7-163439A is configured to lock the side portion in the standing position and to release the lock in accordance with the sitting movement of the occupant or the opening/closing operation of the vehicle door. However, in some scenarios, the side portion needs to be locked in the standing position in a state other than the entry/exit of the occupant into/from the vehicle. A reason for this is that, for example, the side portion of the seat cushion inclines, and the holding property for the sitting occupant may thus be impaired when the occupant moves to slightly stand up from the seat main body, or the occupant moves to open the vehicle door in a state where the occupant remains sitting.

Moreover, it is generally desired for the occupant to be supported by the entry/exit support device particularly during the exit from the vehicle. Therefore, there is a need for an entry/exit support device capable of particularly more surely assisting the vehicle exit movement of the occupant.

SUMMARY

The present disclosure has been made in view of the problems described above, and therefore an embodiment provides a vehicle seat provided with a side support device configured to assist the entry/exit behavior of the occupant while stably securing the holding property for the sitting occupant. Moreover, another embodiment of the present disclosure provides a vehicle seat provided with a side support device particularly configured to more surely assist the vehicle exit behavior of the occupant.

At least some of the problems described above are solved by, in a vehicle seat according to an embodiment of the present disclosure, including a seat main body on which an occupant can be seated, and a side support device configured to support a side portion of the seat main body in a seat widthwise direction to be switchable between a seating available state where the occupant can be seated and a vehicle exit assist state where a vehicle exit behavior of the occupant is assisted. The vehicle seat includes a first detector configured to detect sitting of the occupant on the seat main body, a second detector configured to detect a state change in a detection subject that changes state in accordance with the vehicle exit behavior of the occupant, and an operation device configured to operate the side support device so that the side portion is switched from the seating available state to the vehicle exit assist state when the second detector detects the state change in the detection subject after the first detector starts detecting the seating of the occupant. With the configuration described above, in order to operate the side support device, thereby moving the side portion of the seat main body from the seating available state to the vehicle exit assist state when the occupant exits from the vehicle, the second detector detects the seating of the occupant after the first detector starts detecting the seating of the occupant. Therefore, compared with the conventional example, the side portion can surely be maintained in the seating available state except for the exit of the occupant from the vehicle. Thus, it is possible to realize a vehicle seat with a side support device capable of assisting the vehicle exit behavior of the occupant while stably securing the holding property for the seating occupant.

In an embodiment, preferably, the first detector is a first sensor that outputs a detection signal when the sitting of the occupant on the seat main body is detected, the second detector is a second sensor that outputs a detection signal when the state change in the detection subject is detected, and the operation device is an operation control device that applies action control to the side support device when the detection signal is received from the second sensor after start of reception of the detection signal from the first sensor. As described above, the operation of the side support device can be controlled with the simple configuration including the first sensor, the second sensor, and the operation control device (such as an ECU (electronic control unit)), resulting in a decrease in the size of the vehicle seat.

In an embodiment, the operation device preferably is configured to operate the side support device when the detection by the second detector occurs while the first detector continues to detect the sitting of the occupant. With the configuration described above, the detection by the second detector needs to be carried out while the first detector continues to detect the sitting of the occupant in order to move the side portion of the seat main body from the seating available state to the vehicle exit assist state. Therefore, the side portion can more surely be maintained in the seating available state except for the exit of the occupant from the vehicle.

In an embodiment, preferably, the first detector is arranged in a center portion in the seat widthwise direction in the seat main body, and the second detector is arranged in the side portion in the seat main body. Moreover, preferably, the second detector detects sitting of the occupant on the side portion as the vehicle exit behavior of the occupant. With the configuration described above, the side support device can be operated to be preferably adapted to the exit behavior of the seating occupant from the vehicle. Therefore, it is possible to provide a vehicle seat with a side support device capable of more surely assisting only the vehicle exit behavior of the occupant.

In an embodiment, preferably, the first detector is configured to be located more in an area for receiving a seating load imposed by the occupant than the second detector. With the configuration described above, the first detector arranged in the center portion of the seat main body can be increased in size by effectively using a relatively vacant space at the center portion, and the vehicle exit behavior of the occupant can thus more precisely by detected.

In an embodiment, preferably, the seat main body includes a seat cushion that serves as a seating portion, the side support device is configured to support the side portion of the seat cushion to be switchable, and the first detector and the second detector are respectively arranged in a center portion in a seat front to back direction in the seat cushion. With the configuration described above, the sitting load imposed from the occupant can efficiently be detected when the occupant seating on the seat cushion exits from the vehicle.

In an embodiment, preferably, the side support device includes a lock device configured to lock the side portion in the seating available position, and the operation device is configured to operate the side support device to release a lock state of the lock device when the detection by the second detector occurs after the first detector starts the detection. With the configuration described above, the side portion can be locked in the seating available state in a case other than the exit of the occupant from the vehicle.

In an embodiment, preferably, a child seat detector is configured to detect attachment of a child seat to the seat main body is provided, and the operation device is configured to operate the side support device so that the side portion cannot be switched when the detection by the child seat detector occurs. With the configuration described above, when the child seat is attached to the seat main body, a safety lock is engaged for an infant or a child.

In an embodiment, preferably, an anchor member that attaches an attached portion provided for the child seat is provided in the seat main body, and the first detector and the second detector are respectively arranged outside the anchor member in the seat widthwise direction in the seat main body. With the configuration described above, even when the child seat is attached to the seat main body, risk of influence on the detection precisions of the first detector and the second detector is decreased.

Therefore, compared with the conventional example, the side portion can surely be maintained in the seating available state except for the exit of the occupant from the vehicle. Thus, a vehicle seat is provided with a side support device capable of assisting the vehicle exit behavior of the occupant while stably securing the holding property for the seating occupant. According to the present disclosure, the operation of the side support device can be controlled with the simple configuration including the first sensor, the second sensor, and the operation control device, resulting in a decrease in the size of the vehicle seat. According to the present disclosure, the side portion can more surely be maintained in the seating available state except for the exit of the occupant from the vehicle.

According to the present disclosure, the side support device can be operated to be preferably adapted to the behavior of the seating occupant to exit from the vehicle. Therefore, a vehicle seat is provided with a side support device capable of more surely assisting only the vehicle exit behavior of the occupant. According to the present disclosure, the vehicle exit behavior of the occupant can more precisely be detected. According to the present disclosure, the sitting load imposed from the occupant can efficiently be detected when the occupant seating on the seat cushion exits from the vehicle.

According to the present disclosure, the side portion can be locked in the seating available state in a case other than the exit of the occupant from the vehicle. According to the present disclosure, when a child seat is attached to the seat main body, the safety lock can be applied for an infant or a child. According to the present disclosure, even when the child seat is attached to the seat main body, the risk of influence on the detection precisions of the first detector and the second detector is decreased.

BRIEF DESCRIPTION OF DRAWINGS

Various embodiments of the invention are illustrated in the drawings, in which.

DETAILED DESCRIPTION

Hereinafter, a description will now be given of a vehicle seat according to an embodiment of the present disclosure referring to FIGS. 1 to 16. This embodiment relates to an invention of a vehicle seat provided with side support devices. Each of the side support devices is configured to support a side portion of a seat cushion of the vehicle seat to be switchable between a seating available state and a vehicle exit assist state. The side support devices include lock devices, each of which is configured to lock the corresponding side portion in the seating available state, and lock release devices, each of which is configured to release a lock state of the lock device. The lock release devices include a first lock release lever, configured to detect a state where an occupant is sitting on a seat main body of the vehicle seat, and a second lock release lever, configured to detect a state where the occupant is sitting on the side portion according to a vehicle exit movement. The lock release devices are configured to release the lock state when the second lock release lever detects the sitting of the occupant while the first lock release lever continues to detect the sitting of the occupant. It should be noted that the lock release device corresponds to an operation device, and the first lock release lever and the second lock release lever respectively correspond to a first detector and a second detector. It should be noted that a side on which an occupant sits on a seatback of the vehicle seat is a seat front side.

Figure 1:
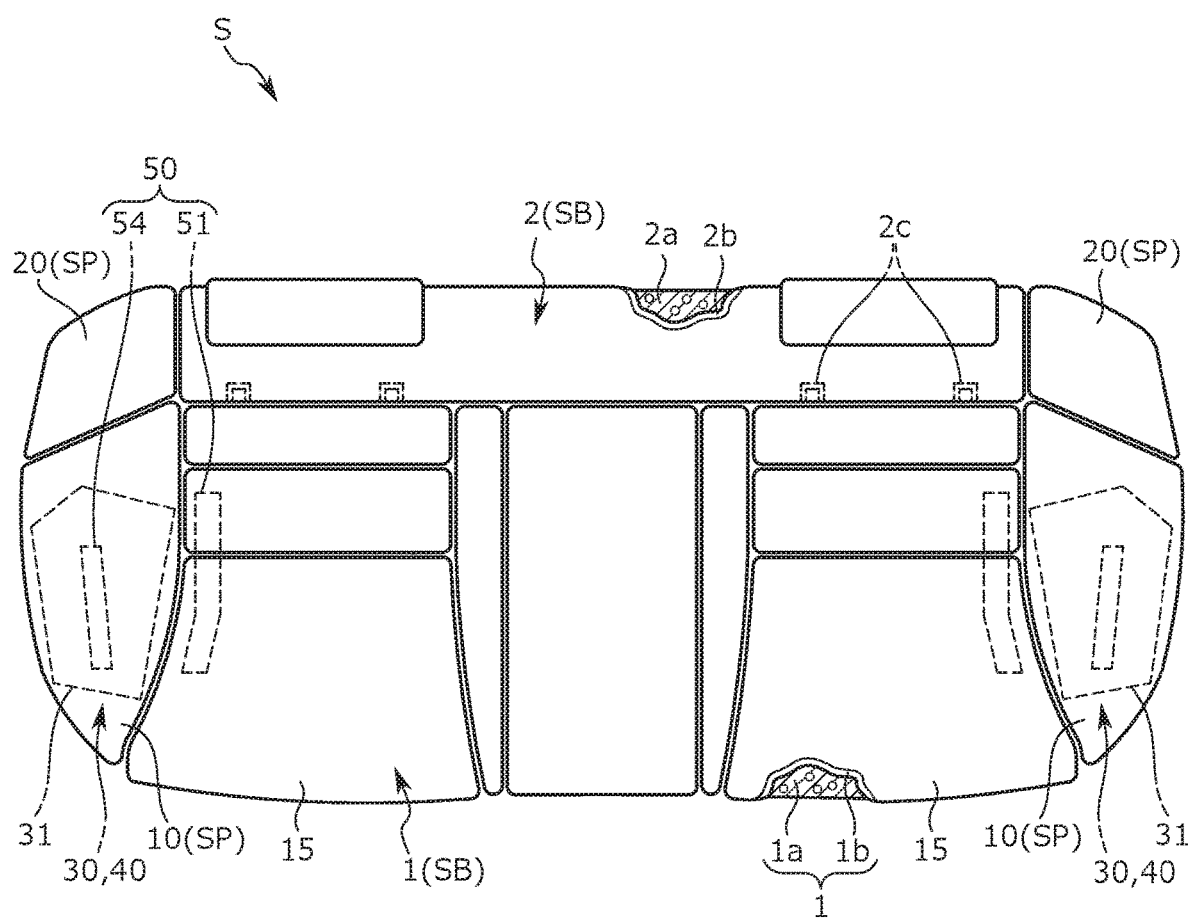
FIG. 1 is a top view of an appearance of a vehicle seat according to an embodiment.

The vehicle seat S according to this embodiment is a rear seat corresponding to a rear portion seat of the vehicle, for example. The vehicle seat S includes seat cushions 1 and a seatback 2 as shown in FIG. 1, and is mainly constructed by seat main bodies SB on which an occupant can seat, side support devices 30 each of which is configured to support a side portion SP of the seat main body SB to be able to move between a seating available position and a vehicle exit assist position, lock devices 40 each of which is configured to lock the side portion SP in the seating available position, and lock release devices 50 each of which is configured to release a lock state of the lock device 40. It should be noted that the side support device 30 is provided in a cushion side portion 10 in a seat widthwise direction of the seat cushion 1, is not particularly limited in terms of the provided position, and may be provided in a back side portion 20 of the seatback 2.

The vehicle seat S is a seat configured to operate the side support device 30 to be able to assist the vehicle exit behavior of the sitting occupant. Specifically, the vehicle seat S is a seat configured to move each of the cushion side portions 10 between the seating available position provided so that a sitting surface is protruded with respect to a cushion center portion 15 as shown in FIG. 3 (also referred to as a protruded position, a position providing the seating available state) and the vehicle exit assist position provided so that the sitting surface is recessed with respect to the cushion center portion 15 as shown in FIG. 8 (also referred to as recessed position, a position providing the vehicle exit assist state). Therefore, when the cushion side portion 10 is supported in the seating available position by the side support device 30, a holding property for the sitting occupant can be increased. Moreover, when the cushion side portion 10 is supported in the vehicle exit assist position, a load imposed on the occupant who is moving over the cushion side portion 10 can be decreased when the occupant opens a door of the vehicle for the vehicle exit.

The seat cushion 1 is a sitting portion that supports the occupant from below, and is constructed by placing a cushion material 1a on a cushion frame that forms a frame (not shown), and covering the cushion material 1a with a skin 1b as shown in FIG. 1 and FIG. 3. The seatback 2 is a backrest portion that supports the back of the occupant from behind, and is constructed by placing a cushion material 2a on a back frame that forms a frame (not shown), and covering the cushion material 2a with a skin 2b as shown in FIG. 1. Right and left anchor members 2c that are attached to the seatback 2 are configured to attach attached portions provided for a child seat (not shown). Right and left side portions in the seat widthwise direction of the seat cushion 1 and the seatback 2 are respectively formed as cushion side portions 10 and back side portions 20 that support the sitting occupant to wrap around the occupant from the outsides in the seat widthwise direction.

The cushion side portion 10 is formed by placing the cushion material 12 on a side frame 11 made of resin, and covering the cushion material 12 with a skin material 13, and the side support device 30 is attached between the side frame 11 and the cushion material 12 in a top to bottom direction as shown in FIG. 1 and FIG. 3. The cushion side portion 10 is supported by the side support device 30 to be movable between the seating available position shown in FIG. 3 and the vehicle exit assist position at which the cushion material 12 recesses downward in the state where the side frame 11 is fixed as shown in FIG. 8.

Figure 2:
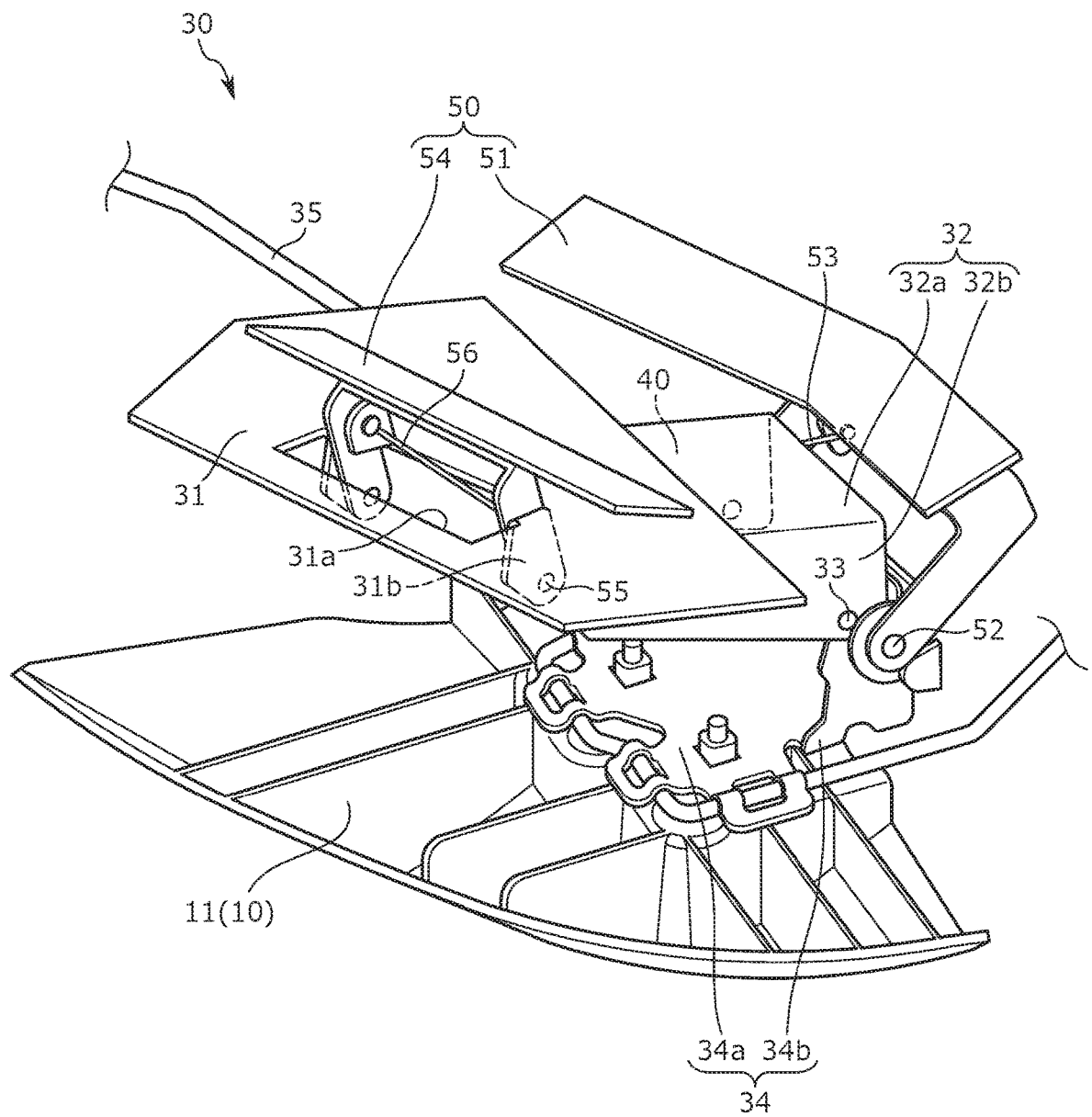
FIG. 2 is an partial wireframe perspective view of a side support device.

The side support device 30 is a device that supports the cushion side portion 10 to be movable in accordance with the vehicle exit behavior of the occupant, and is arranged across insides of the cushion side portion 10 and the cushion center portion 15 as shown in FIG. 1 and FIG. 3. The side support device 30 is mainly constructed by a side plate 31 (formed in a plate-like shape and configured to support the cushion side portion 10 from below), a side bracket 32 (formed in a U-like shape in a lengthwise cross section and attached to a bottom surface of the side plate 31), a side base 34 (configured to support the side plate 31 and the side bracket 32 via a rotation shaft 33 to be rotatable between the seating available position and the vehicle exit assist position), and a side wire 35 that is coupled at a center portion to the side base 34 and extends to protrude outward from the side base 34 as shown in FIG. 2. It should be noted that the side wire 35 is an attachment wire that is inserted into an attachment hole (not shown, provided inside the cushion material 12), and attaches the side support device 30 inside the cushion side portion 10.

The side plate 31 is constructed by a metal plate, and is arranged in a center portion in the seat front to back direction in the cushion side portion 10 as shown in FIG. 1 and FIG. 2. A through hole 31a, in a rectangular shape passing through in the top to bottom direction, and a pair of sidewall portions 31b, formed by downward bending both end portions in the seat front to back direction in edge portions of the through hole 31a, are provided in an outer portion in the seat widthwise direction on a top surface of the side plate 31. A second lock release lever 54 is arranged in the portion in which the through hole 31a is formed, and the second lock release lever 54 is rotatably attached to the pair of sidewall portions 31b via a turn shaft 55.

The side bracket 32 is constructed by a U-shape body longer in the seat widthwise direction as shown in FIG. 2, and is mainly constructed by a top wall portion 32a that attaches the side plate 31 and a pair of sidewall portions 32b bent downward and extending from both end portions in the seat front to back direction of the top wall portion 32a. The pair of sidewall portions 32b are attached to sidewall portions 34b of a side base 34 constructed by a U-shape body via a rotation shaft 33 extending along the seat front to back direction. Moreover, components of a lock device 40 and a lock release device 50 are attached on an inner surface of the sidewall portion 32b on the back side as shown in FIG. 10.

The side base 34 is mainly constructed by a bottom wall portion 34a attached on the side frame 11 and the pair of sidewall portions 34b bent upward and extending from both end portions in the seat front to back direction of the bottom wall portion 34a. A first lock release lever 51 is rotatably attached to the pair of sidewall portions 34b via a turn shaft 52 extending along the seat front to back direction.

Figure 10:
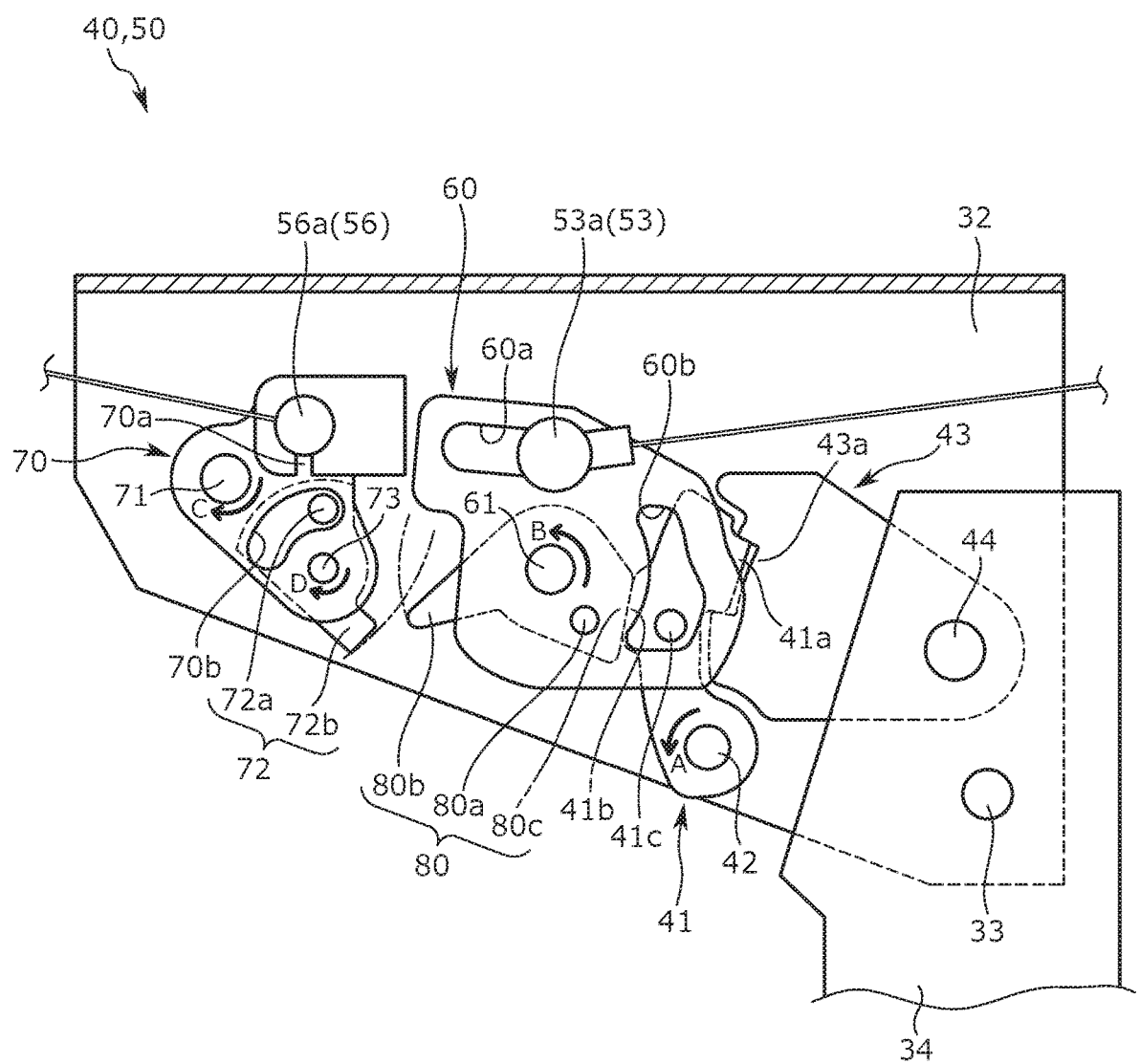
FIG. 10 is a schematic view of a state where a lock device is locking a side portion in a seating available position in the side support device in FIG. 3.

The lock device 40 is a device configured to lock the side plate 31 and the side bracket 32 in the seating available position, and is arranged on the inner surface of the sidewall portion 32b on the seat back side in the side bracket 32 as shown in FIG. 2 and FIG. 10. The lock release device 50 is a device configured to release the lock state of the lock device 40, and includes the first lock release lever 51 and the second lock release lever 54 as shown in FIG. 2. The first lock release lever 51 is a member configured to rotate about the turn shaft 52 between a lock position shown in FIG. 2 and a lock release position displaced downward from the lock position, and is operated by a first transmission cable 53 to the lock position. The second lock release lever 54 is a member configured to rotate about the turn shaft 55 between a lock position shown in FIG. 2 and a lock release position displaced downward from the lock position, and is operated by a second transmission cable 56 to the lock position. The first lock release lever 51 is configured to be located more in an area for receiving a sitting load of the occupant than the second lock release lever 54. It should be noted that a detailed description of the lock device 40 and the lock release device 50 is given below.

Operation of Side Support Device

A description is now given of a specific operation of the side support device 30 based on FIG. 3 to FIG. 9. First, the side support device 30 is in such a state as to support the cushion side portion 10 in the seating available position as shown in FIG. 3B before the occupant enters the vehicle as shown in FIG. 3A. Moreover, the lock device 40 locks the cushion side portion 10 in the seating available position, and the first lock release lever 51 and the second lock release 54 of the lock release device 50 are respectively in such states as to be held to the lock positions.

Figure 4A:
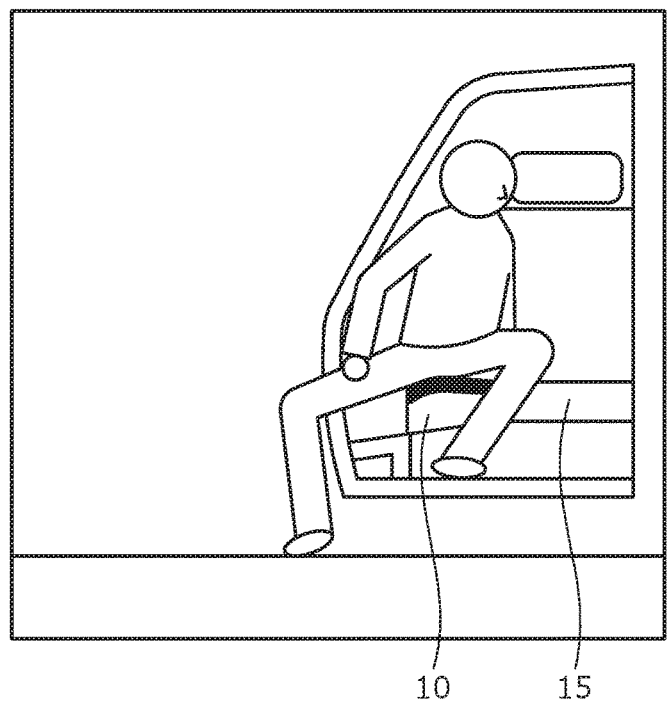
FIG. 4A is a front view of a state of the side support device during the vehicle entry of the occupant (part 1)
Figure 4B:
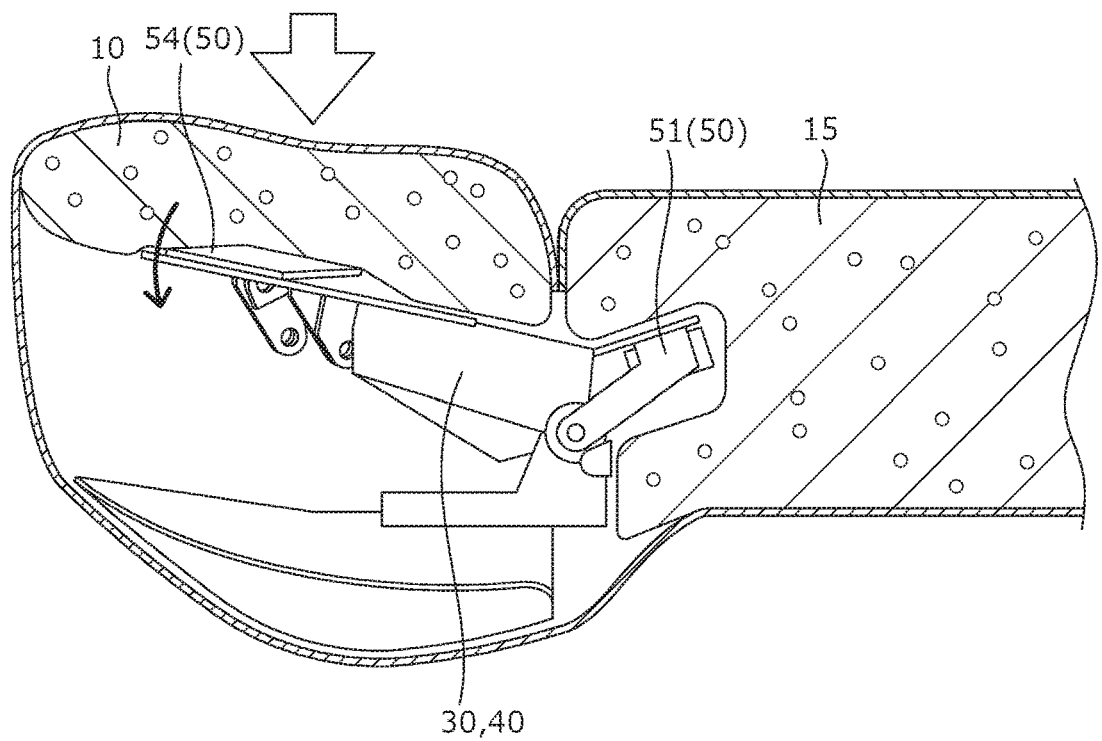
FIG. 4B is a partial front view of the state of the side support device during the vehicle entry of the occupant (part 1)

Then, when the occupant sits on the cushion side portion 10 to try to enter the vehicle as shown in FIG. 4A, a predetermined sitting load is applied to the second lock release lever 54, and the second lock release lever 54 thus rotationally move from the lock position to the lock release position as shown in FIG. 4B. In an embodiment, there is provided such a configuration that the lock state of the lock device 40 is not released only by the movement of the second lock release lever 54 to the lock release position.

Figure 5A:
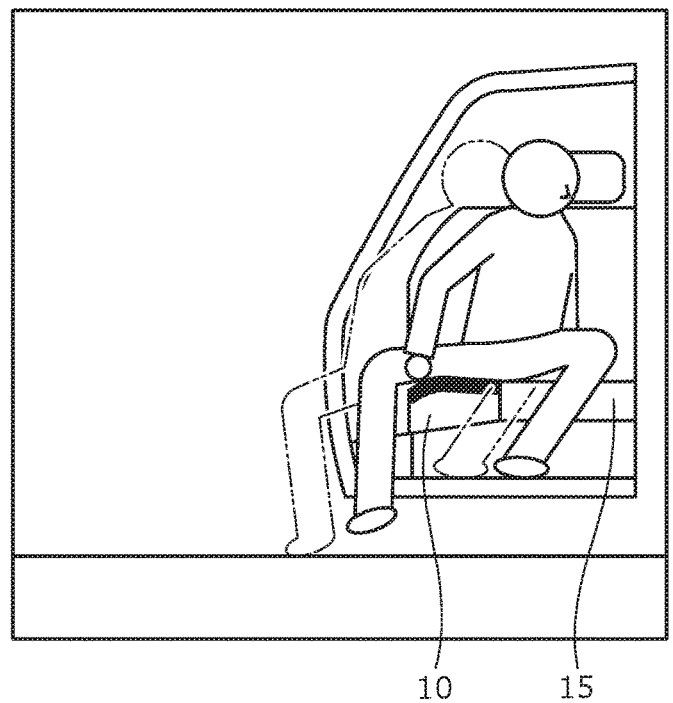
FIG. 5A is a front view of a state of the side support device during the vehicle entry of the occupant (part 2)
Figure 5B:
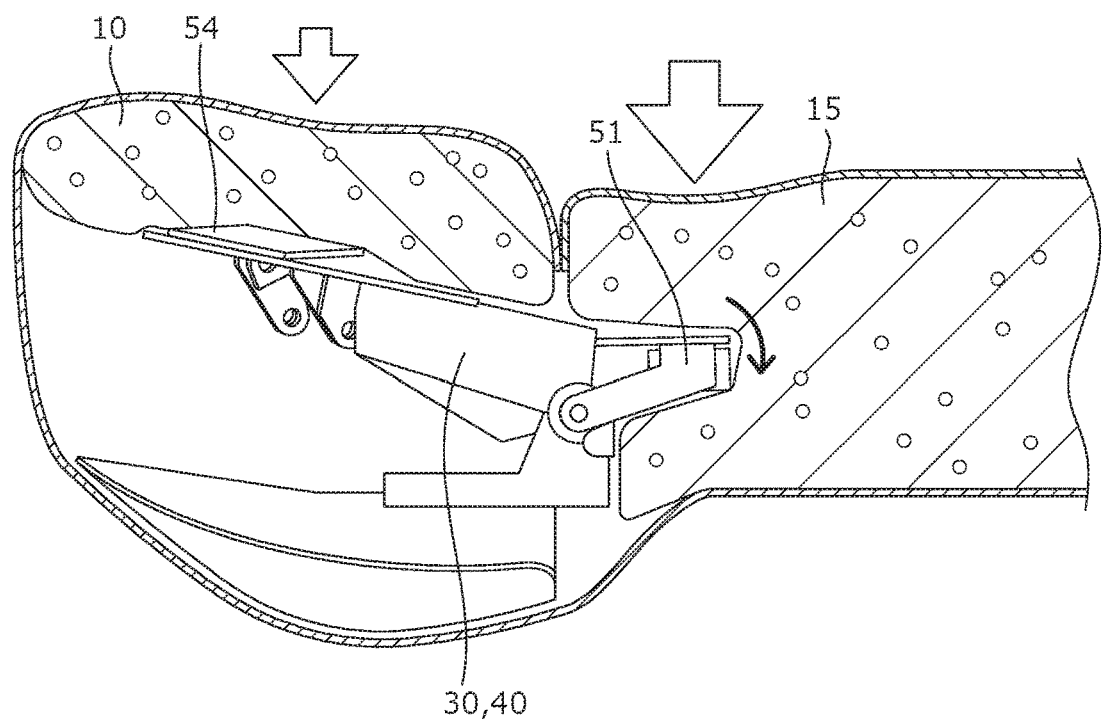
FIG. 5B is a partial front view of the state of the side support device during the vehicle entry of the occupant (part 2)

Then, when the occupant sits on the cushion side portion 10 and the cushion center portion 15 to try to enter the vehicle as shown in FIG. 5A, the first lock release lever 51 rotationally moves from the lock position to the lock release position as a result of application of a predetermined sitting load in the state where the second lock release lever 54 is positioned in the lock release position as shown in FIG. 5B. In an embodiment, there is provided such a configuration that the lock state of the lock device 40 is not released when the second lock release lever 54 and the first lock release lever 51 move to the lock release positions in this sequence.

Figure 6A:
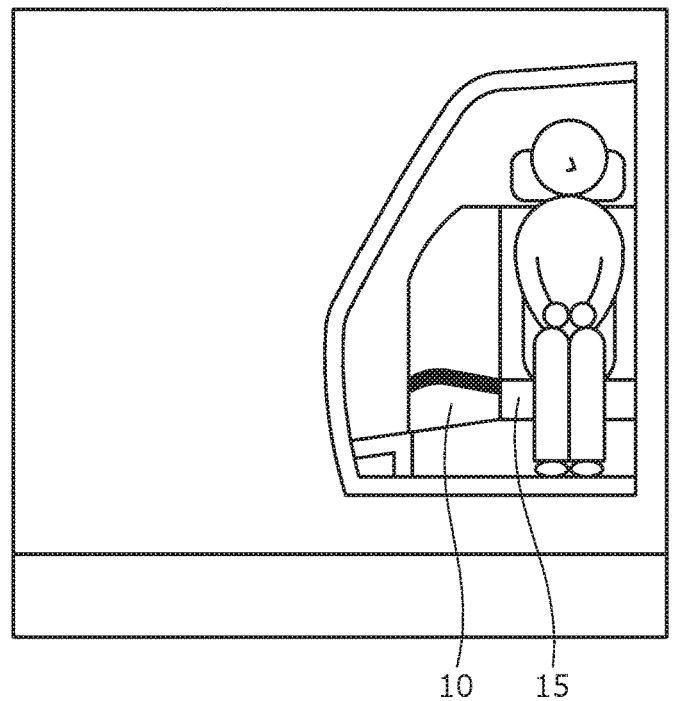
FIG. 6A is a front view of a state of the side support device while the occupant is sitting.
Figure 6B:
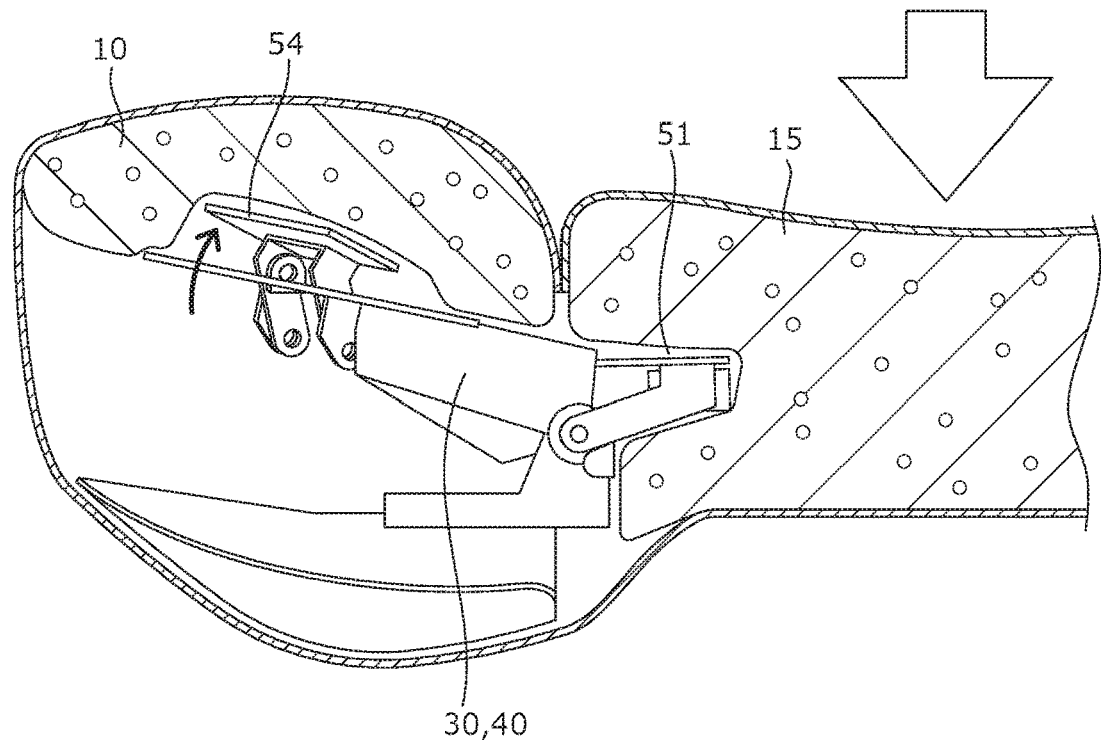
FIG. 6B is a partial front view of the state of the side support device while the occupant is sitting.

When the occupant is in a sitting state as shown in FIG. 6A, the second lock release lever 54 returns from the lock release position to the lock position as a result of release from the predetermined load, and the first lock release lever 51 is in the state where the first lock release lever 51 is in the lock release position as shown in FIG. 6B. In an embodiment, the cushion side portion 10 is supported in the seating available position by the side support device 30, and the holding property for the sitting occupant can be secured.

Figure 7A:
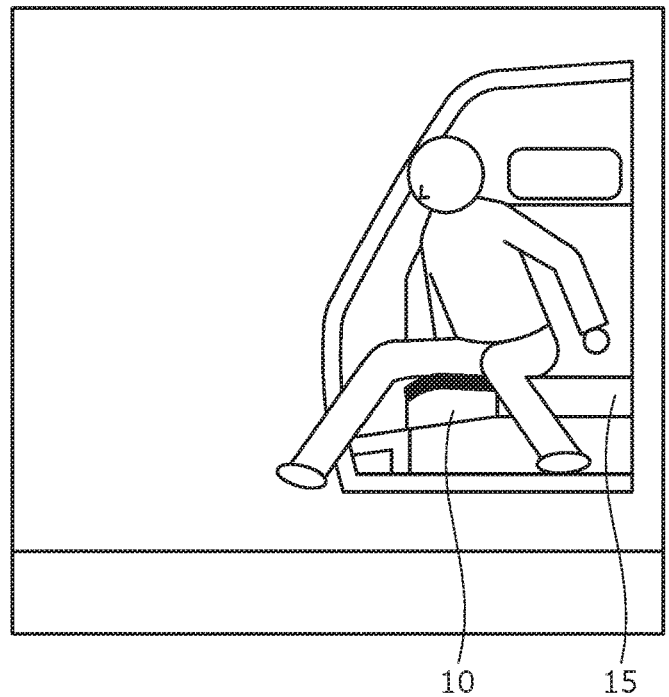
FIG. 7A is a front view of a state of the side support device during vehicle exit of the occupant (part 1)
Figure 7B:
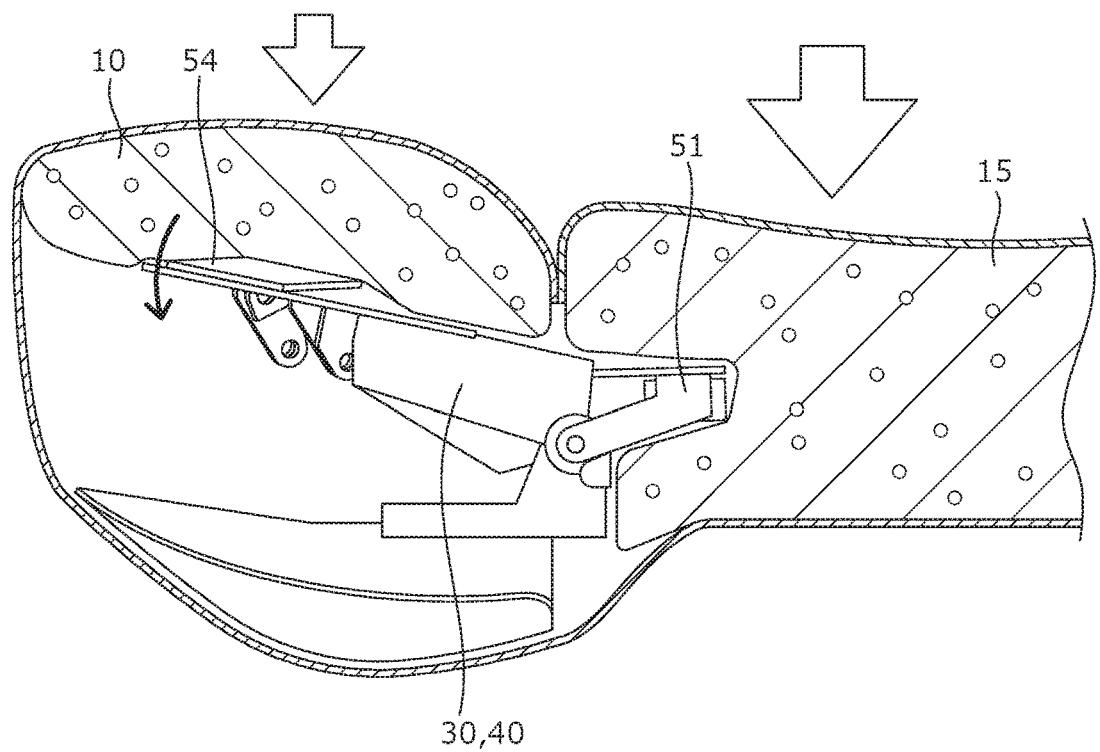
FIG. 7B is a partial front view of the state of the side support device during the vehicle exit of the occupant (part 1)

Then, the occupant moves the body toward the door side to try to exit from the vehicle as shown in FIG. 7A, the second lock release lever 54 rotationally moves from the lock position to the lock release position as a result of the application of the predetermined sitting load in a state where the first lock release lever 51 is positioned in the lock release position as shown in FIG. 7B. In an embodiment, the lock state of the lock device 40 is released as a result of the movement of the first lock release lever 51 and the second lock release lever 54 to the lock release positions in this sequence.

Figure 8A:
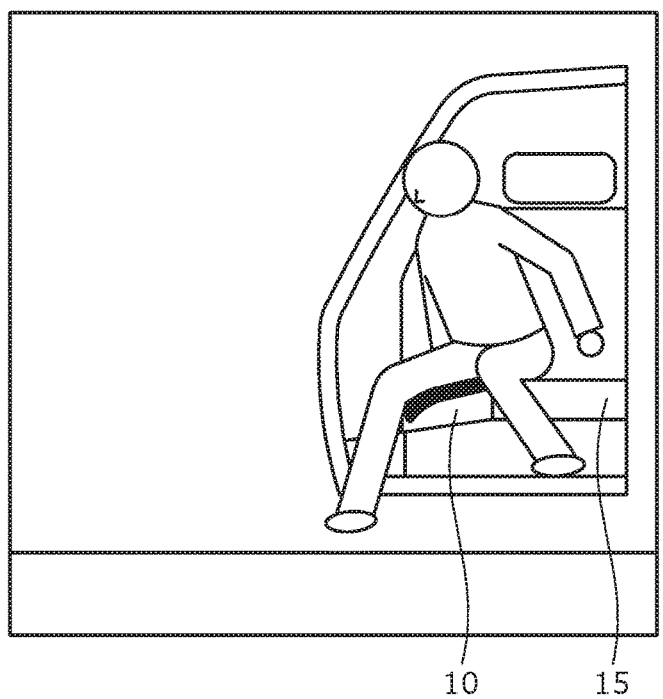
FIG. 8A is a front view of a state of the side support device during the vehicle exit of the occupant (part 2)
Figure 8B:
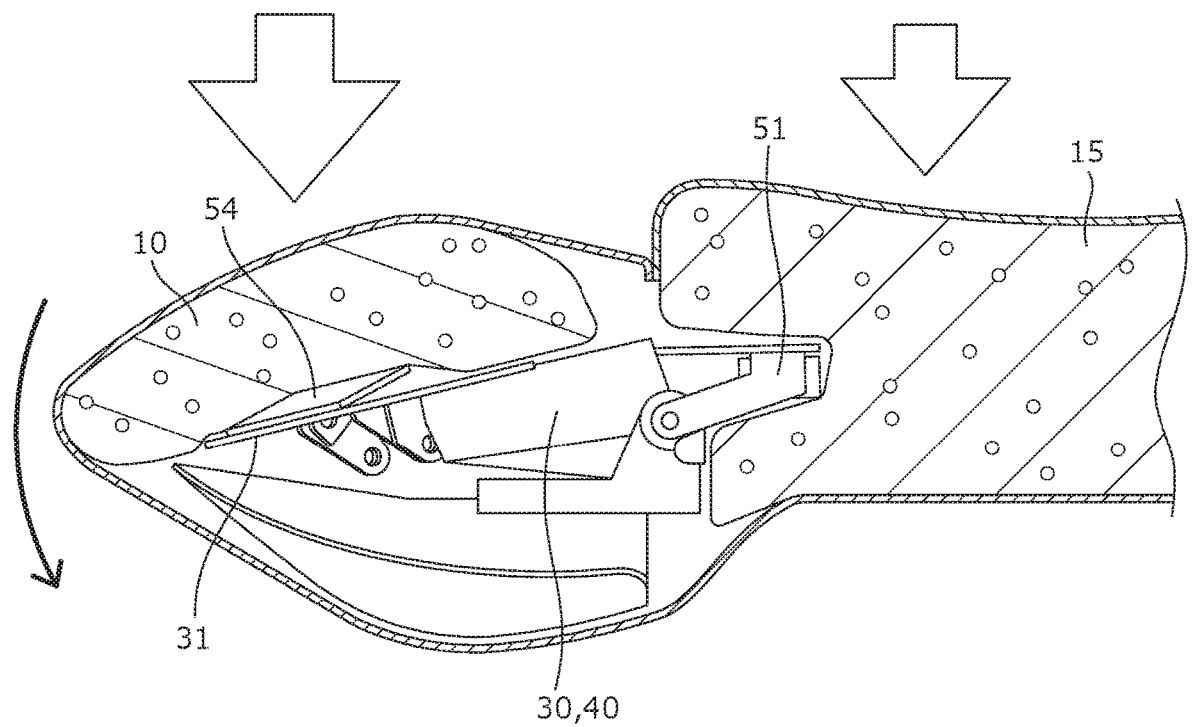
FIG. 8B is a partial front view of the state of the side support device during the vehicle exit of the occupant (part 2)

Then, when the occupant moves the body further toward the door side to try to exit from the vehicle as shown in FIG. 8A, the cushion side portion 10 rotationally moves together with the side plate 31 from the seating available position to the vehicle exit assist position as a result of further application of a sitting load to the cushion side portion 10 as shown in FIG. 8B. As a result, the load imposed on the exiting occupant who is moving over the cushion side portion 10 can be decreased.

Figure 9A:
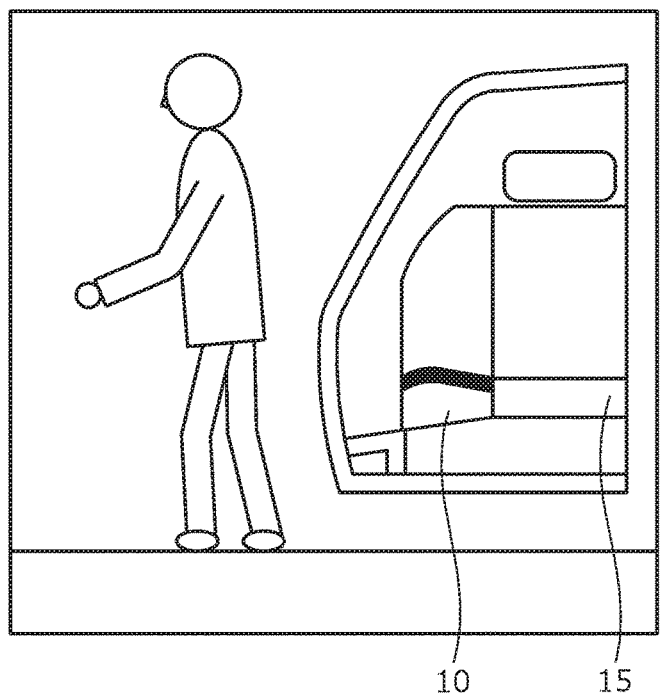
FIG. 9A is a front view of a state of the side support device after the vehicle exit of the occupant.
Figure 9B:
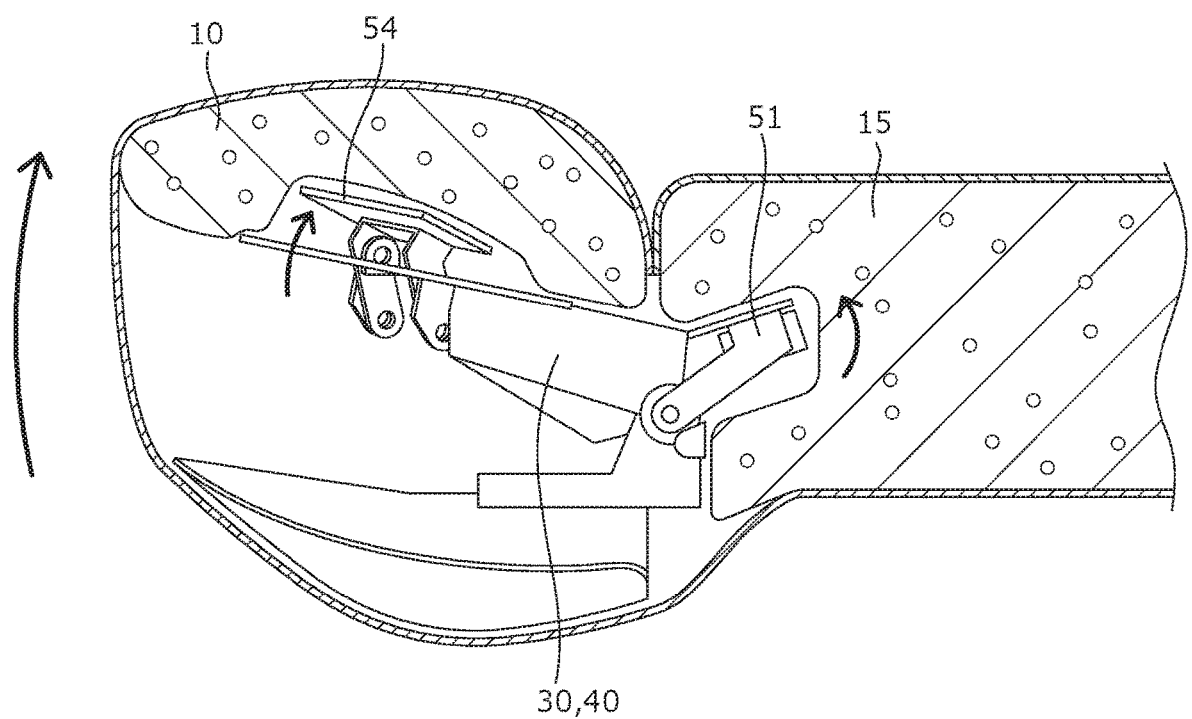
FIG. 9B is a partial front view of the state of the side support device after the vehicle exit of the occupant.

Finally, when the occupant finishes the exit from the vehicle as shown in FIG. 9A, the first lock release lever 51 and the second lock release lever 54 again return to the lock positions, and the lock device 40 returns to the state where the cushion side portion 10 is locked in the seating available position as shown in FIG. 9B. As a result of the series of behaviors described above, the side support device 30 can assist the vehicle exit behavior of the occupant while the hold property for the sitting occupant is stably secured. Moreover, there is provided such a configuration that the cushion side portion 10 is intentionally prevented from inclining during the vehicle entrance behavior of the occupant, and such a consideration that the occupant can surely enter the vehicle is provided.

Details of Lock Device and Lock Release Device

A detailed description will now be given of the lock device 40 and the lock release device 50 based on FIG. 10 to FIG. 16. The lock device 40 is mainly constructed by a lock lever 41 rotatably attached on an inner surface of the side bracket 32 via a support shaft 42 and a locked lever 43 fixed to an inner surface of the side base 34 by using a fixing bolt 44 as shown in FIG. 10. The lock lever 41 and the locked lever 43 are arranged in positions opposing each other.

The lock device 40 locks the side plate 31 (side bracket 32) in the seating available position when the lock lever 41 is at an engagement position shown in FIG. 10 at which the lock lever 41 engages with the locked lever 43. In other words, the cushion side portion 10 is locked in the seating available position. Moreover, the lock device 40 releases the lock state of the side plate 31 (side bracket 32) when the lock lever 41 is at a separation position shown in FIG. 14 at which the lock lever 41 separates from the locked lever 43. In other words, the lock state of the cushion side portion 10 is released.

The lock lever 41 is a member that rotates about the support shaft 42 extending along the seat widthwise direction between the engagement position shown in FIG. 10 and the separation position displaced forward of the seat from the engagement position, and is biased toward an arrow A direction shown in FIG. 10 by a biasing spring, not shown. In other words, the lock lever is biased from an engagement position side to a separation position side. An engagement protrusion 41a to be engaged with an engagement groove 43a provided on the locked lever 43, a held portion 41b arranged on an opposite side of the engagement protrusion 41a in the seat front to back direction, and held by a relay lever 80 described below, and a through protrusion 41c protruding inward in the seat widthwise direction, and arranged to be movable inside a through hole 60b provided in a first transmission lever 60 described below are respectively formed on the lock lever 41. The lock lever 41 is normally held by the relay lever 80, and is arranged in an engagement position at which the engagement protrusion 41a engages with the engagement groove 43a.

The lock release device 50 is further provided with a first transmission lever 60 rotatably attached to the inner surface of the side bracket 32 via a first coupling shaft 61, a second transmission lever 70 rotatably attached to the inner surface of the side bracket 32 via a second coupling shaft 71, and the relay lever 80 attached between the side bracket 32 and the first transmission lever 60, and rotatable via the first coupling shaft 61 as shown in FIG. 10. The lock release lever 50 can move the lock lever 41 from an engagement position shown in FIG. 10 to a separation position shown in FIG. 14 via the relay lever 80 when the first transmission lever 60 and the second transmission lever 70 move from reference positions shown in FIG. 10 to transmission positions shown in FIG. 14.

Figure 13:
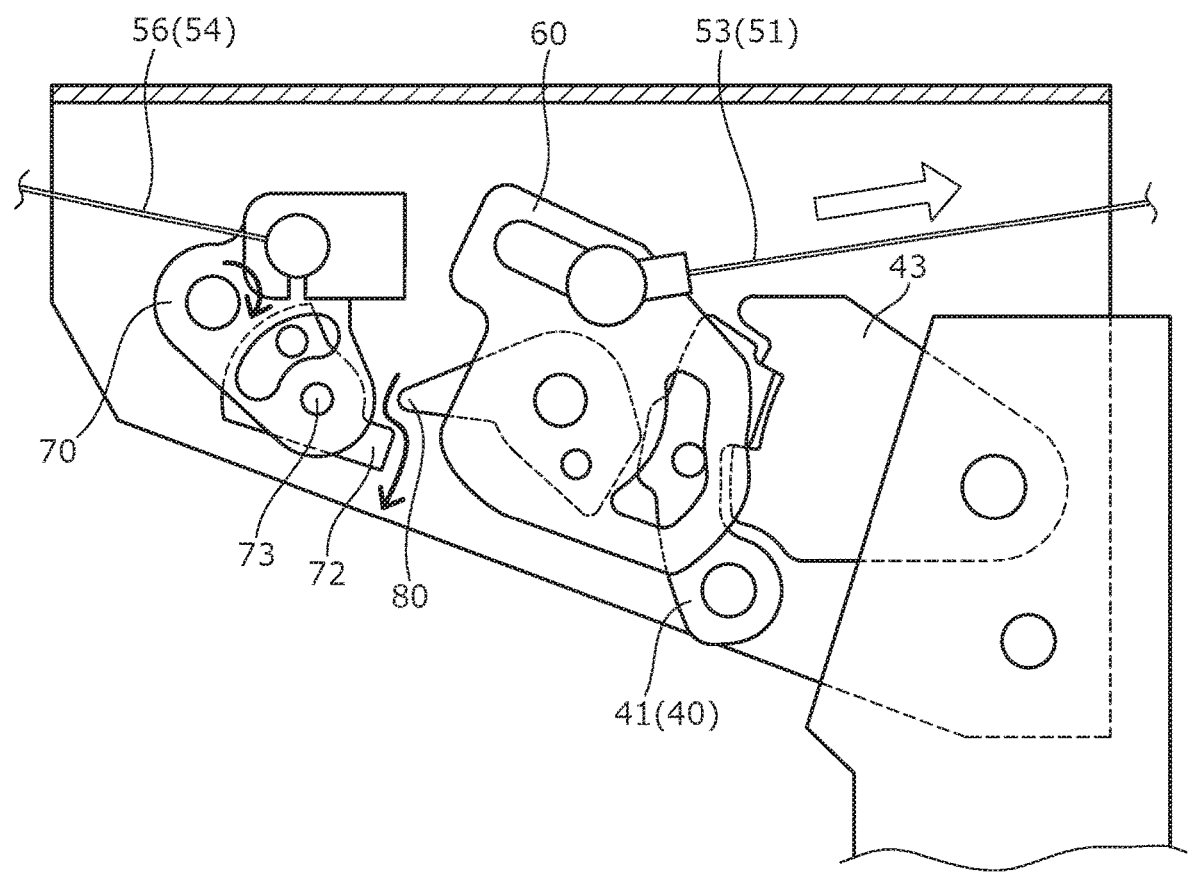
FIG. 13 is a schematic view of a state where the second lock release lever is returned from the lock release position to the lock position in the side support device in FIG. 6.
Figure 14:
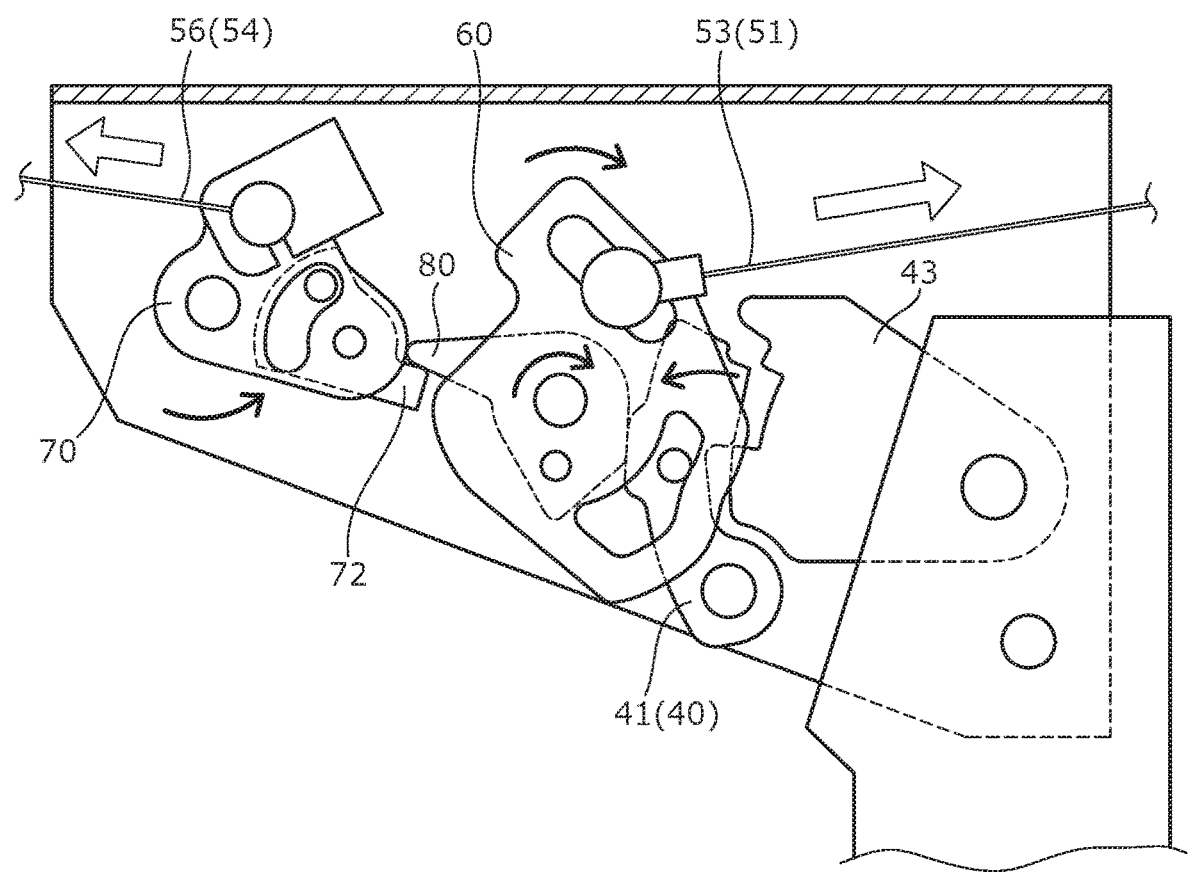
FIG. 14 is a schematic view of a state where the first lock release lever and the second lock release lever are moved in this sequence to the lock release positions in the side support device in FIG. 7.

The first transmission lever 60 is a member that rotates about the first coupling shaft 61 extending along the seat widthwise direction among a reference position shown in FIG. 10, an intermediate position shown in FIG. 13, and displaced downward from the reference position, and a transmission position shown in FIG. 14, and displaced further downward from the intermediate position. The first transmission lever 60 is biased toward an arrow B direction shown in FIG. 10 by a biasing spring, not shown. In other words, the first transmission lever 60 is biased from a transmission position side to a reference position side. On the first transmission lever 60, an attachment hole 60a that attaches a cable attachment end portion 53a of the first transmission cable 53, and a through hole 60b through which the through protrusion 41c of the lock lever 41 passes and a fit hole to which a fit protrusion 80a provided on the relay lever 80 fits respectively arranged on an opposite side of the attachment hole 60a with respect to the first coupling shaft 61 are respectively formed.

The first transmission lever 60 is normally biased toward the arrow B direction by a biasing spring, not shown, and is arranged in the reference position. In an embodiment, an edge portion of the through hole 60b and the through protrusion 41c of the lock lever 41 are arranged in positions so as to not abut against each other. Then, the first transmission lever 60 is pulled by the first transmission cable 53 as a result of the rotation operation of the first lock release lever 51 to rotationally move from the reference position to the intermediate position. In an embodiment, the first transmission lever 60 stably stops in the intermediate position as a result of abutment of the edge portion of the through hole 60b against the through protrusion 41c. In other words, the through protrusion 41c serves as a stopper. Then, the first transmission lever 60 further moves from the intermediate position to the transmission position via the relay lever 80 as a result of the rotation operation of the second transmission lever 70. In an embodiment, the first transmission lever 60 stably stops in the transmission position as a result of abutment of an edge portion of the attachment hole 60a against the cable attachment end portion 53a. In other words, the cable attachment end portion 53a serves as a stopper.

The second transmission lever 70 is a member configured to rotate about the second coupling shaft 71 extending along the seat widthwise direction between a reference position shown in FIG. 10 and a transmission position shown in FIG. 14, and is displaced upward from the reference position. The second transmission lever 70 is biased toward an arrow C direction shown in FIG. 10 by a biasing spring, not shown. In other words, the second transmission lever 70 is biased from a transmission position side to a reference position side. A press lever 72 that presses the relay lever 80 is rotatably attached to the second transmission lever 70 via a coupling pin 73 extending along the seat front to back direction. Moreover, in the second transmission lever 70, an attachment hole 70a that attaches a cable attachment end portion 56a of the second transmission cable 56 and a through hole 70b that is arranged on an opposite side of the attachment hole 70a with respect to the second coupling shaft 71, and through which a through protrusion 72a of the press lever 72 passes, are respectively formed.

The second transmission lever 70 is normally biased toward the arrow C direction by a biasing spring, not shown, and is arranged in the reference position. Moreover, the press lever 72 is also normally biased toward an arrow D direction by a biasing spring, not shown, and is arranged in a reference position shown in FIG. 10. In an embodiment, the through protrusion 72a of the press lever 72 and an edge portion of the through hole 70b are arranged in such positions as to abut against each other. Then, the second transmission lever 70 is pulled by the second transmission cable 56 as a result of the rotation operation of the second lock release lever 54 to rotationally move from the reference position to the transmission position. Moreover, the press lever 72 also rotationally moves from the reference position to the press position shown in FIG. 14. In an embodiment, a press portion 72b of the press lever 72 presses and moves a press reception portion 80b provided on the relay lever 80, and, as a result, the relay lever 80 rotationally moves together with the first lock release lever 51.

The relay lever 80 is a member configured to rotate about the first coupling shaft 61 among a hold position shown in FIG. 10, an intermediate position shown in FIG. 13, and displaced upward from the hold position, and a separation position shown in FIG. 14, and is displaced further upward from the intermediate position. The relay lever 80 is coupled to the first transmission lever 60 via the first coupling shaft 61 and the fit protrusion 80a, and is biased toward the arrow B direction, which is the same as the biasing direction of the first transmission lever 60. In other words, the relay lever 80 is biased from a separation position side to a hold position side. The fit protrusion 80a, the press reception portion 80b that is arranged on an opposite side of the fit protrusion 80a with respect to the first coupling shaft 61, and a holing portion 80c that is arranged on the same side as the fit protrusion 80a with respect to the first coupling shaft 61, and holds the held portion 41b of the lock lever 41 are respectively formed on the relay lever 80.

The relay lever 80 is normally biased toward the arrow B direction, and is arranged in the hold position. The hold position here is a position in which the hold portion 80c holds the lock lever 41 in the engagement position. Then, the relay lever 80 rotationally moves from the hold position to the intermediate position in accordance with the rotation operation of the first transmission lever 60. In an embodiment, the hold portion 80c maintains the state where the lock lever 41 is held in the engagement position. Then, the relay lever 80 rotationally moves from the intermediate position to the separation position in accordance with the rotation operation of the second transmission lever 70 (press lever 72). The separation position here is a position in which the hold portion 80c is separated from the state where the hold portion 80c is holding the lock lever 41 in the engagement position. As a result, the lock lever 41 is biased toward the arrow A direction, and moves from the engagement position to the separation position. In other words, the lock state of the lock device 40 is released.

Operations of Lock Device and Lock Release Device

Figure 3A:
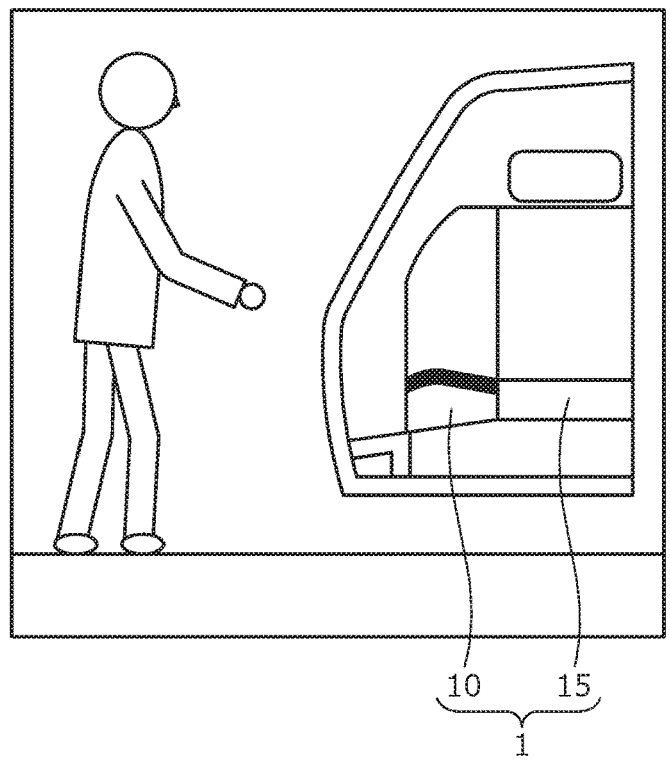
FIG. 3A is a front view of a state of the side support device before vehicle entry of the occupant.
Figure 3B:
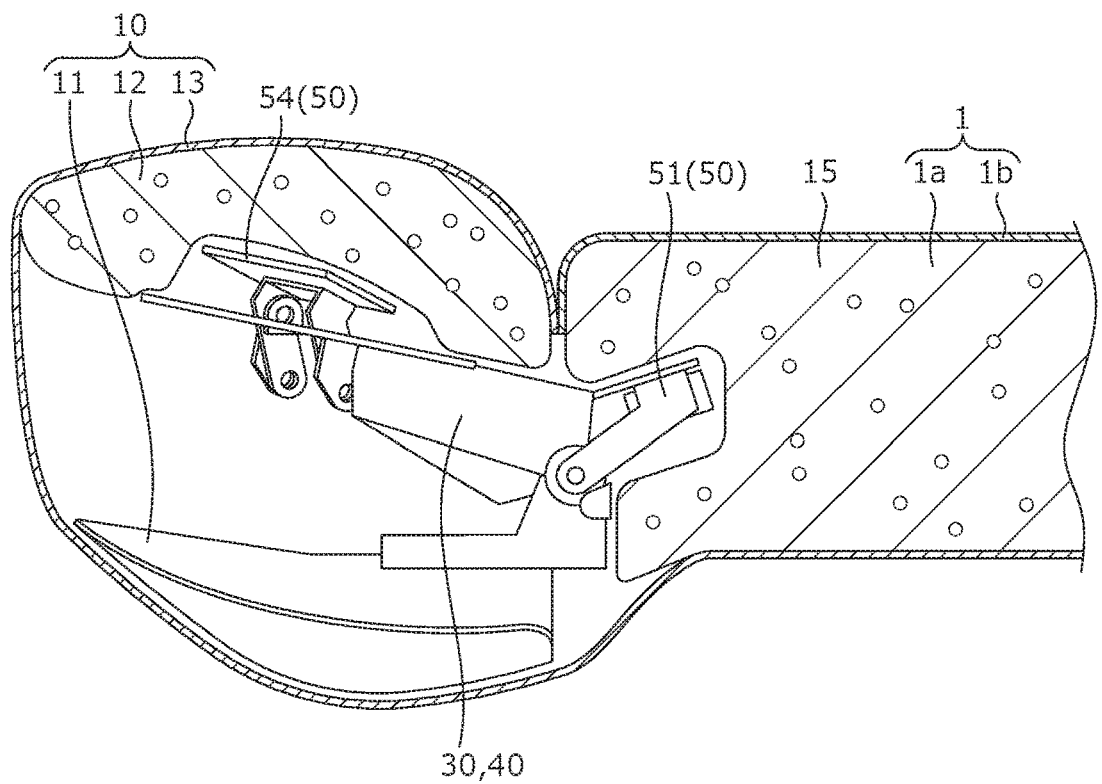
FIG. 3B is a partial front view of the state of the side support device before the vehicle entry of the occupant.

A description will now be given of specific operations of the lock device 40 and the lock release device 50 based on FIG. 3 to FIG. 9 and FIG. 10 to FIG. 16. First, the lock lever 41 is arranged in the engagement position in which the lock lever 41 is engaged with the locked lever 43 as shown in FIG. 10 before the occupant enters the vehicle as shown in FIG. 3A. Moreover, the first transmission lever 60 and the second transmission lever 70 (press lever 72) are arranged in the reference positions, and the relay lever 80 is arranged in the hold position. In other words, the state is such that the lock device 40 locks the cushion side portion 10 in the seating available position as shown in FIG. 3B.

Figure 11:
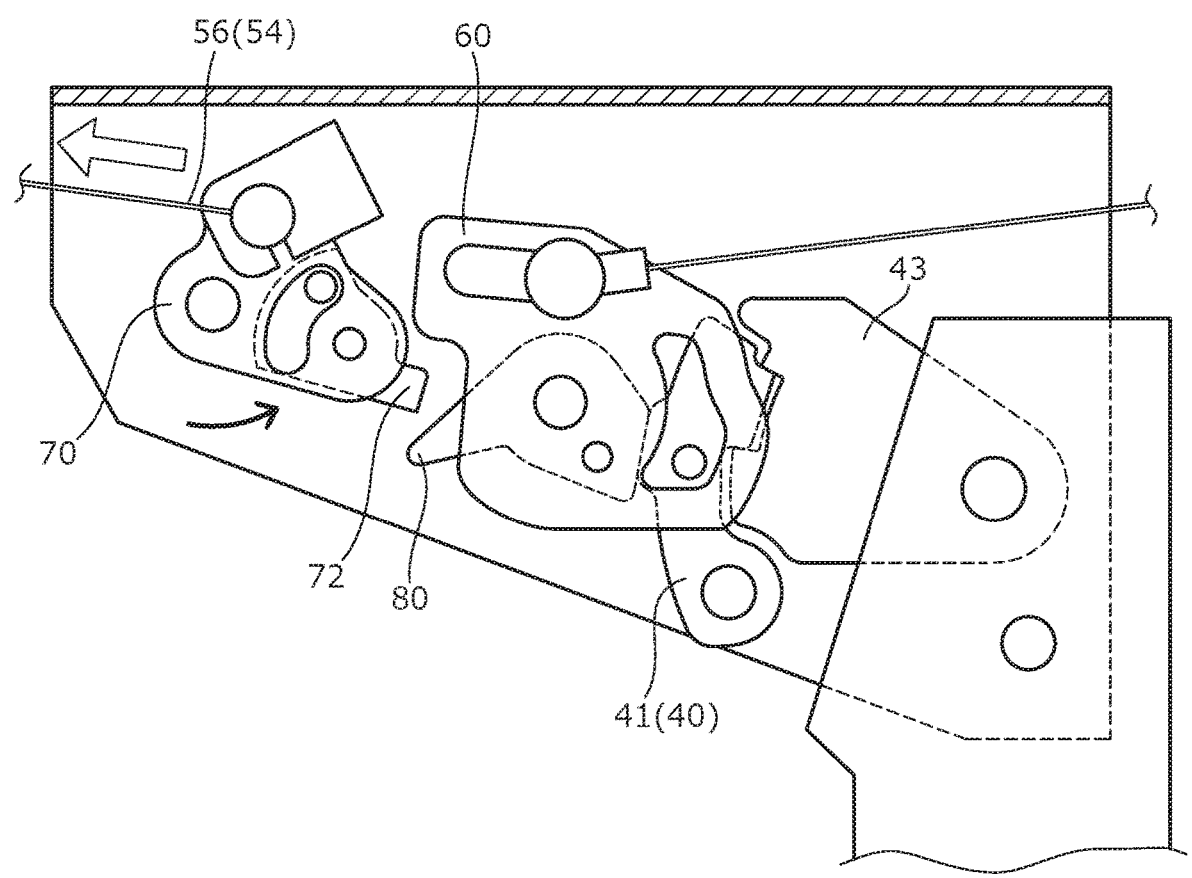
FIG. 11 is a schematic view of a state where a second lock release lever is moved from a lock position to a lock release position in the side support device in FIG. 4.

Then, when the occupant sits on the cushion side portion 10 to try to enter the vehicle as shown in FIG. 4A, the second transmission lever 70 (press lever 72) is pulled by the second lock release lever 54, and rotationally moves from the reference position to the transmission position as shown in FIG. 11. In an embodiment, the press lever 72 does not press and move the relay lever 80, and freely swings. As a result, the lock lever 41 is still arranged in the engagement position, and the lock state of the lock device 40 is not released.

Figure 12:
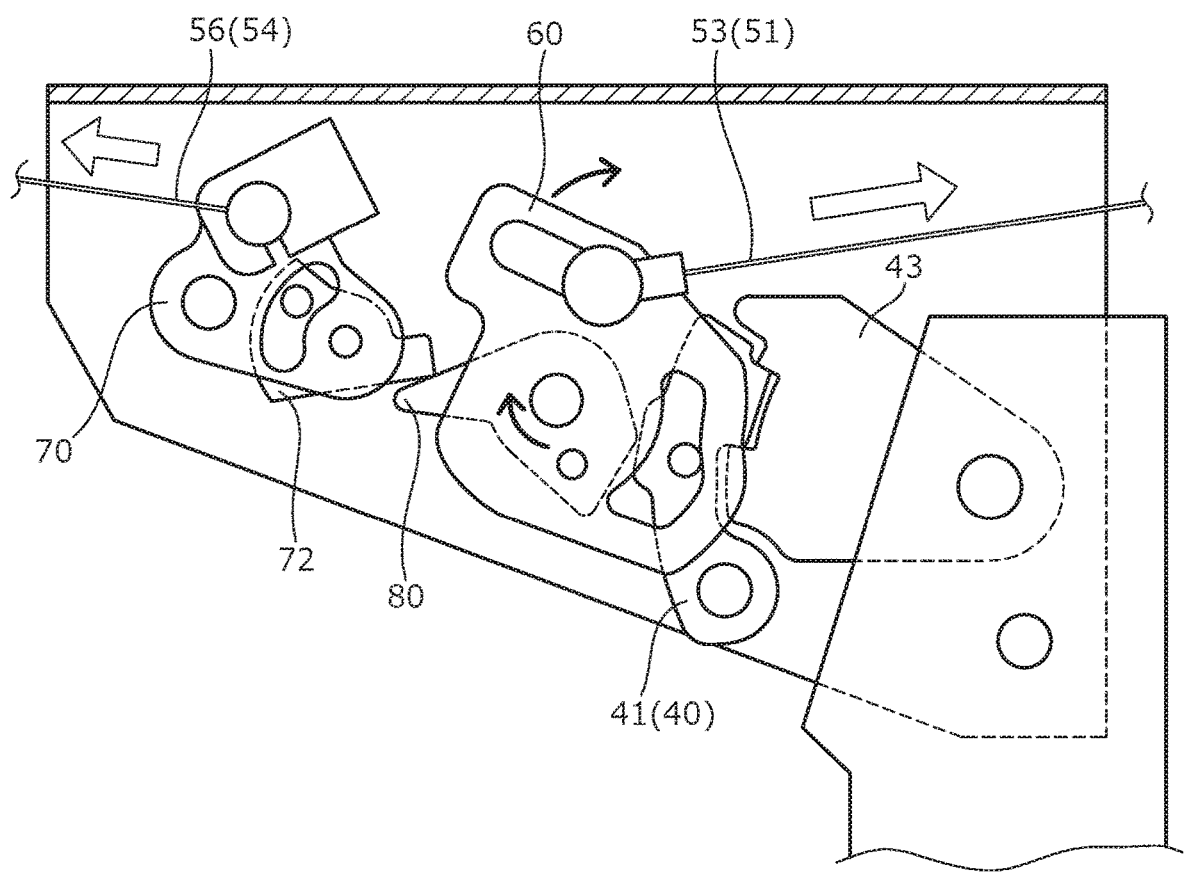
FIG. 12 is a schematic view of a state where the second lock release lever and then a first lock release lever are moved in sequence to lock release positions in the side support device in FIG. 5.

Then, when the occupant sits on the cushion side portion 10 and the cushion center portion 15 to try to enter the vehicle as shown in FIG. 5A, the first transmission lever 60 is pulled by the first lock release lever 51, and rotationally moves from the reference position to the intermediate position in the state where the second transmission lever 70 (press lever 72) is positioned in the transmission position as shown in FIG. 12. Moreover, the relay lever 80 rotates together with the first transmission lever 60, thereby rotationally moving from the hold position to the intermediate position. In an embodiment, the press lever 72 and the relay lever 80 are in such a state as to freely swing independently of each other. As a result, the lock lever 41 is still arranged in the engagement position, and the lock state of the lock device 40 is not released.

Then, the second transmission lever 70 (press lever 72) is separated from the pull operation of the second lock release lever 54, and, as a result, returns again from the transmission position to the reference position as shown in FIG. 13 in a state where the occupant is sitting as shown in FIG. 6A. In an embodiment, the press lever 72 rotates about the coupling pin 73 with respect to the second transmission lever 70, thereby freely swinging to move over the relay lever 80, and returning to the reference position. As a result, the lock lever 41 is still arranged in the engagement position, and the lock state of the lock device 40 is not released.

Then, when the occupant moves his/her body toward the door side to try to exit from the vehicle as shown in FIG. 7A, the second transmission lever 70 (press lever 72) is pulled by the second lock release lever 54, thereby rotationally moving from the reference position to the transmission position in a state where the first transmission lever 60 is positioned in the intermediate position as shown in FIG. 14. Moreover, the relay lever 80 is pressed and moved by the press lever 72, thereby rotationally moving from the intermediate position to the separation position. As a result, the lock lever 41 separates from the state where the lock lever 41 is held in the engagement position by the relay lever 80, and rotationally moves from the engagement position to the separation position. In other words, the lock state of the lock device 40 is released.

Figure 15:
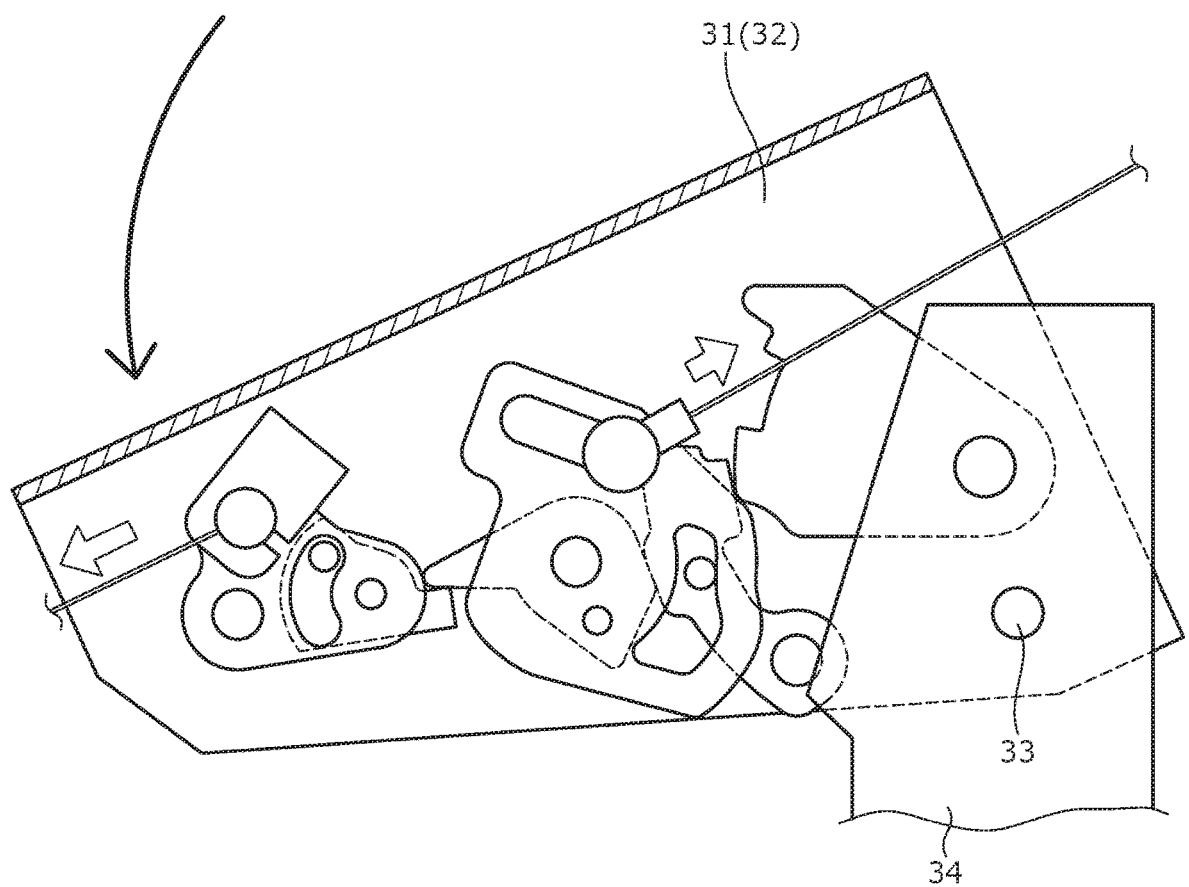
FIG. 15 is a schematic view of a state where the lock by the lock device is released, thereby moving the side portion from the seating available position to a vehicle exit assist position in the side support device in FIG. 8.

Then, when the occupant moves the body further toward the door side to try to exit from the vehicle as shown in FIG. 8A, the side plate 31 (side bracket 32) rotationally moves from the seating available position to the vehicle exit assist position with respect to the side base 34 as a result of the application of the sitting load of the occupant as shown in FIG. 15. As a result, the cushion side portion 10 rotationally moves from the seating available position to the vehicle exit assist position as shown in FIG. 8B.

Figure 16:
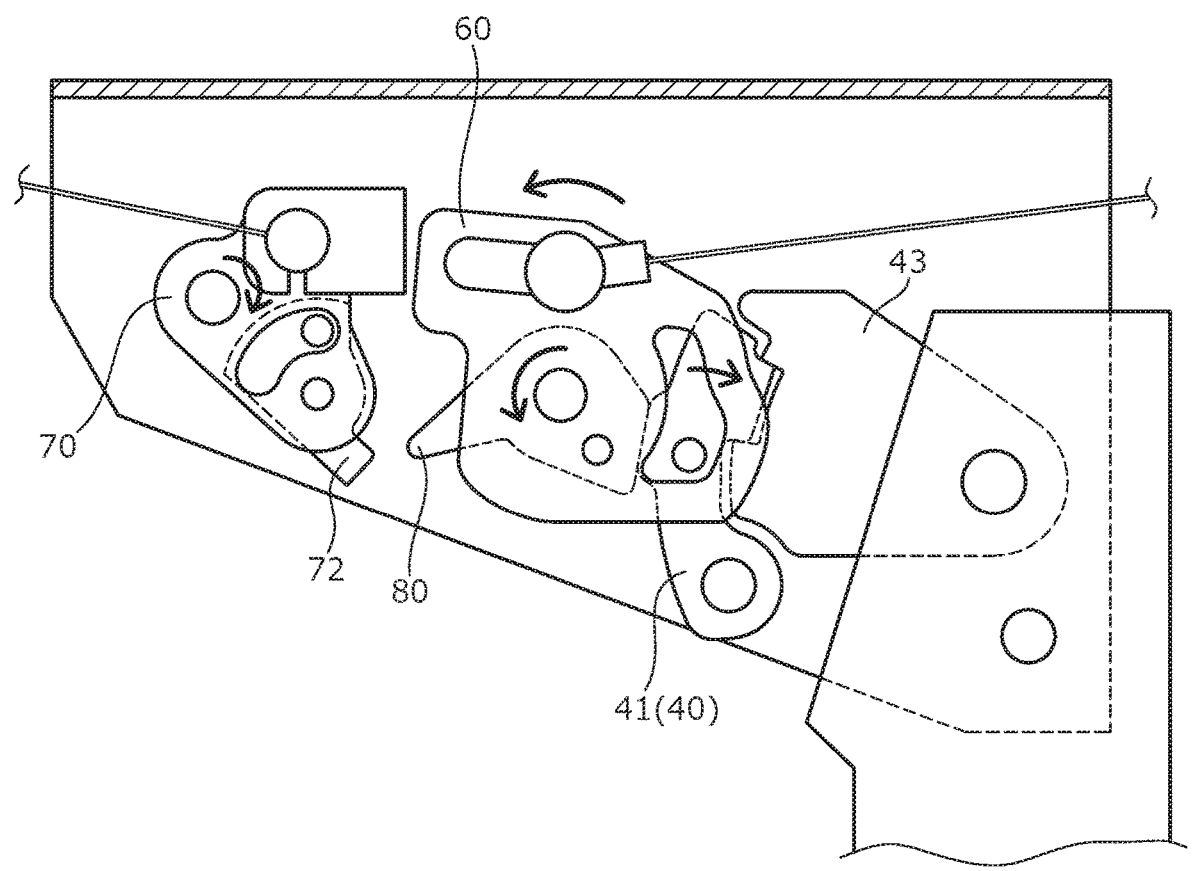
FIG. 16 is a schematic view of a state where the first lock release lever and then the second lock release lever are returned in sequence to the lock positions, and the lock of the lock device is applied again in the side support device in FIG. 9.

Finally, when the occupant finishes the exit from the vehicle as shown in FIG. 9A, the first transmission lever 60 and the second transmission lever 70 (press lever 72) again return to the reference position, and the relay lever 80 returns to the hold position as shown in FIG. 16. Moreover, the lock lever 41 again returns to the engagement position at which the lock lever 41 engages with the locked lever 43. The lock state and the lock release state of the lock device 40 and the locked device 50 are switched as a result of the series of operations described above.

The lock release device 50 is operated by applying the predetermined load on the sitting surface of the side portion SP in the seat main body SB in order to move the side portion SP of the seat main body SB from the protruded position to the recessed position when the occupant enters/exits from the vehicle as described above. Therefore, the lock release device 50 can be operated more closely in accordance with the behavior of the occupant from the entrance into the vehicle to the sitting state or the behavior of the occupant from the sitting state to the exit from the vehicle compared with the conventional example. In other words, it is possible to provide the side support device 30 configured to assist the entry/exit behaviors of the occupant while stably securing the hold property for the sitting occupant.

Moreover, the lock release device 50 includes the first lock release lever 51 and the second lock release lever 54 that respectively operate to release the lock state, and the first lock release lever 51 and the second lock release lever 54 are provided in the positions different from each other as described above. With this configuration, the first lock release lever 51 and the second lock release lever 54 need to be operated in order to move the side portion SP of the seat main body SB from the protruded position to the recessed position when the occupant enters/exits from the vehicle. As a result, in a case other than the cases where the occupant enters and exits from the vehicle, the side support SP can more surely be locked in the protruded position.

Moreover, the first lock release lever 51 is arranged in the cushion center portion 15 in the seat widthwise direction, and moves from the lock position to the lock release position as a result of the application of the predetermined load on the sitting surface of the cushion center portion 15 as described above. On the other hand, the second lock release lever 54 is arranged in the side portion SP in the seat widthwise direction, and moves from the lock position to the lock release position as a result of the application of the predetermined load on the sitting surface of the side portion SP. Therefore, with the relatively simple structure using the sitting load of the occupant, the operations of the two of the first lock release lever 51 and the second lock release lever 54 can be provided.

Further, the lock release device 50 releases the lock state when the second lock release lever 54 moves from the lock position to the lock release position in the state where the first lock release lever 51 is positioned in the lock release position as described above. With this configuration, the first lock release lever 51 is positioned in the lock release position when the occupant is sitting, and the second lock release lever 54 moves from the lock position to the lock release position when the sitting occupant exits from the vehicle. Therefore, the lock release member can be operated to be preferably adapted to the exit behavior of the sitting occupant from the vehicle.

Further, the side support device 30 is configured to support the side portion SP of the seat cushion 1 to be movable. Then, the first lock release lever 51 and the second lock release lever 54 rotationally move along axes along the seat front to back direction, and are simultaneously arranged in the center portion in the seat front to back direction in the seat cushion 1. With this configuration, the sitting load from the occupant sitting on the seat cushion 1 can efficiently be transmitted to the first lock release lever 51 and the second lock release lever 54.

Moreover, the lock device 40 is configured to engage the lock lever 41 provided for the side plate 31 with the locked lever 43 provided for the side base 34 in order to lock the side plate 31. The side portion SP can surely be locked in the standing position through the engagement between the lock lever 41 and the locked lever 43 in this way when the occupant enters/exits from the vehicle.

Further, the lock lever 41 is attached to the side plate 31 through the support shaft 42, and attached to be rotatable about the support shaft 42 between the engagement position at which the lock lever 41 engages with the locked lever 43 and the separation position at which the lock lever 41 separates from the locked lever 43. Then, the rotation shaft 33 of the support plate 31 and the support shaft 42 extend along the same direction. With the configuration described above, the rotation shaft 33 of the side plate 31 and the support shaft 42 of the lock lever 41 rotate about axes along the same direction, the simple operation of the side support device 30 can be realized, and a compact size of the side support device 30 can simultaneously be achieved.

Moreover, the lock release device 50 includes the first transmission lever 60 that is interposed between the first lock release lever 51 and the lock lever 41, and transmits the operation of the first lock release lever 51 to the lock lever 41. The first transmission lever 60 is attached to the side plate 31 via the first coupling shaft 61, and can rotate about the first coupling shaft 61 between the reference position and the transmission position for the transmission to the lock lever 41. Then, the rotation shaft 33 and the first coupling shaft 61 extend along the same direction. With the configuration described above, the rotation shaft 33 and the first coupling shaft 61 rotate about the axes along the same direction, the simple operation of the side support device 30 can be realized, and the compact size of the side support device 30 can be achieved.

Moreover, the lock release device 50 includes the second transmission lever 70 that is interposed between the second lock release lever 54 and the lock lever 41, and transmits the operation of the second lock release lever 54 to the lock lever 41. The second transmission lever 70 is attached to the side plate 31 via the second coupling shaft 71, and can rotate about the second coupling shaft 71 between the reference position and the transmission position for the transmission to the lock lever 41. The first coupling shaft 61 and the second coupling shaft 71 extend along the same direction, and the first transmission lever 60 rotationally moves from the reference position to the intermediate position in accordance with the operation of the first lock release lever 51. Then, the first transmission lever 60 rotationally moves to the transmission position in accordance with the rotation operation of the second transmission lever 70 when the second transmission lever 70 rotationally moves from the reference position to the transmission position in a state where the first transmission lever 60 is positioned in the intermediate position.

The lock release device 50 is preferably configured to move the lock lever 41 in the engagement position to the separation position when the first transmission lever 60 and the second transmission lever 70 move to the transmission positions. With the configuration described above, the rotation shaft 33, the first coupling shaft 61, and the second coupling shaft 71 rotate about axes in the same direction, the simple operation of the side support device 30 can be realized, and the compact size of the side support device 30 can be achieved. Moreover, the lock lever 41 can be operated by the first transmission lever 60 and the second transmission lever 70 preferably in accordance with the behavior of the sitting occupant to exit from the vehicle.

As described above, the lock release device 50 includes the first transmission cable 53 that couples the first lock release lever 51 and the first transmission lever 60 to each other, and is pulled by the operation of the first lock release lever 51, thereby rotating the first transmission lever 60 from the reference position to the transmission position. The lock release lever 51 arranged in the cushion center portion 15 of the seat body SB and the first transmission lever 60 arranged in the side portion SP of the seat main body SB can be preferably coupled to each other by employing the first transmission cable 53 in this way. Moreover, the cable attachment end portion 53a attached to the first transmission lever 60 at the end portion of the first transmission cable 53 is arranged between, in the seat widthwise direction, the support shaft 42 and the first coupling shaft 61 respectively extending along the seat front to back direction. Further, the cable attachment end portion 53a is arranged in a position closer to the support shaft 42 than the first coupling shaft 61 in the seat widthwise direction, and is thus arranged in a position closer to the lock lever 41. As a result, the first transmission lever 60 can efficiently transmit the pulling operation of the first transmission cable 53 to the lock lever 41.

Second Embodiment of Vehicle Seat

Figure 17:
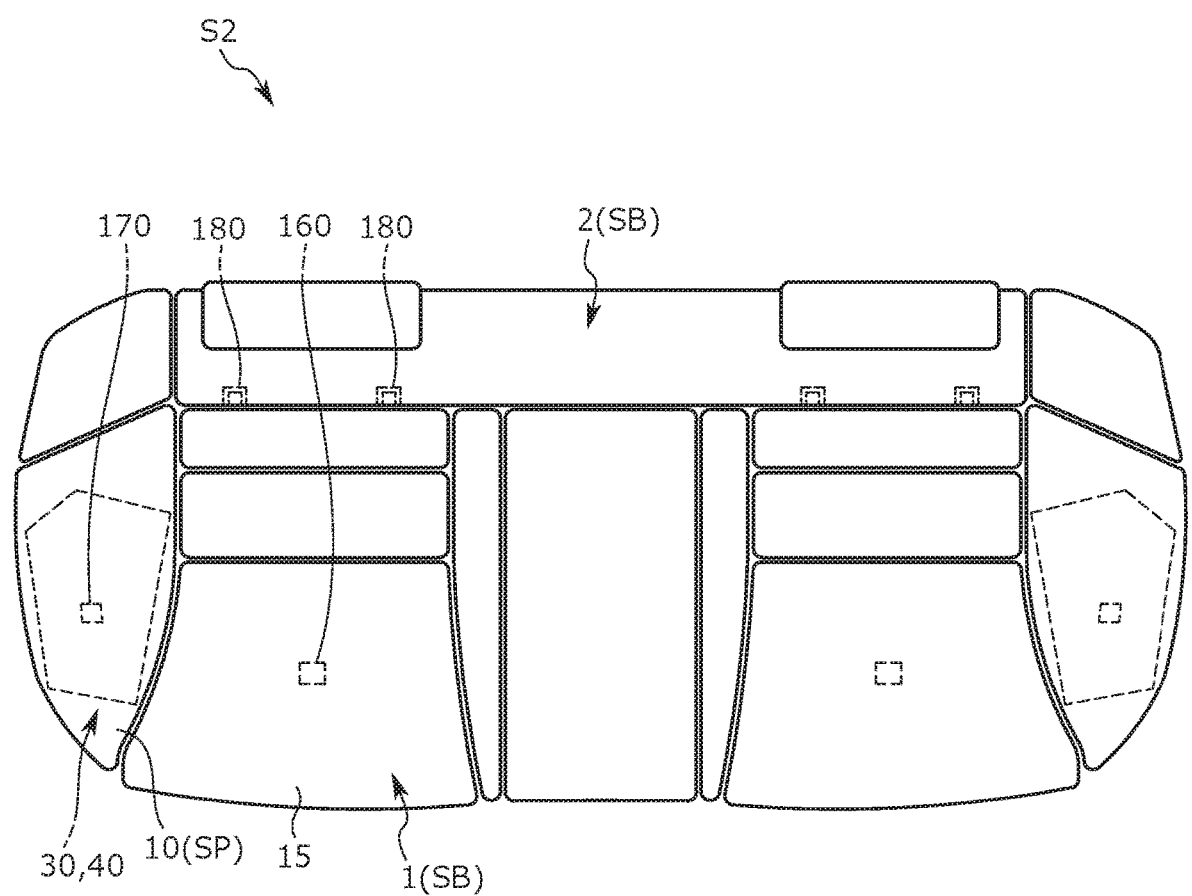
FIG. 17 is a top view of an appearance of the vehicle seat according to a second embodiment.
Figure 18:
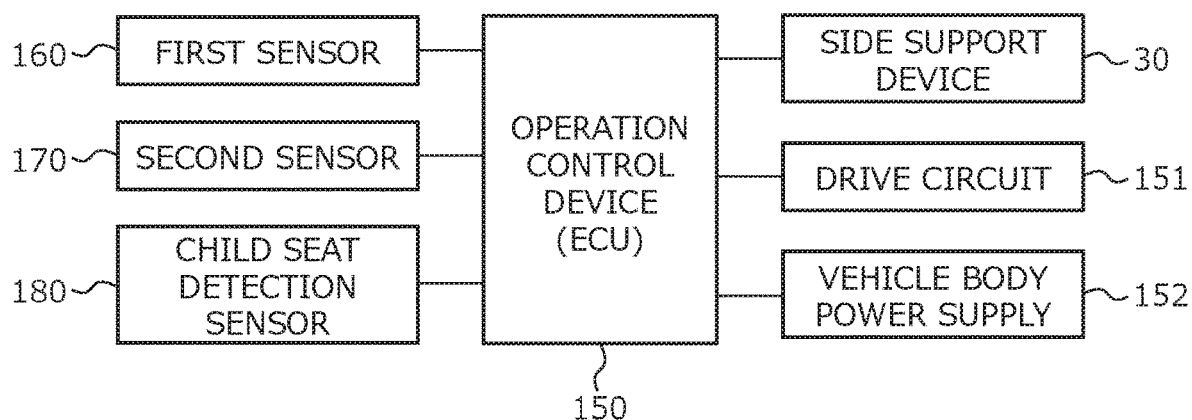
FIG. 18 is a block diagram of an example electrical structure of the side support device.
Figure 19:
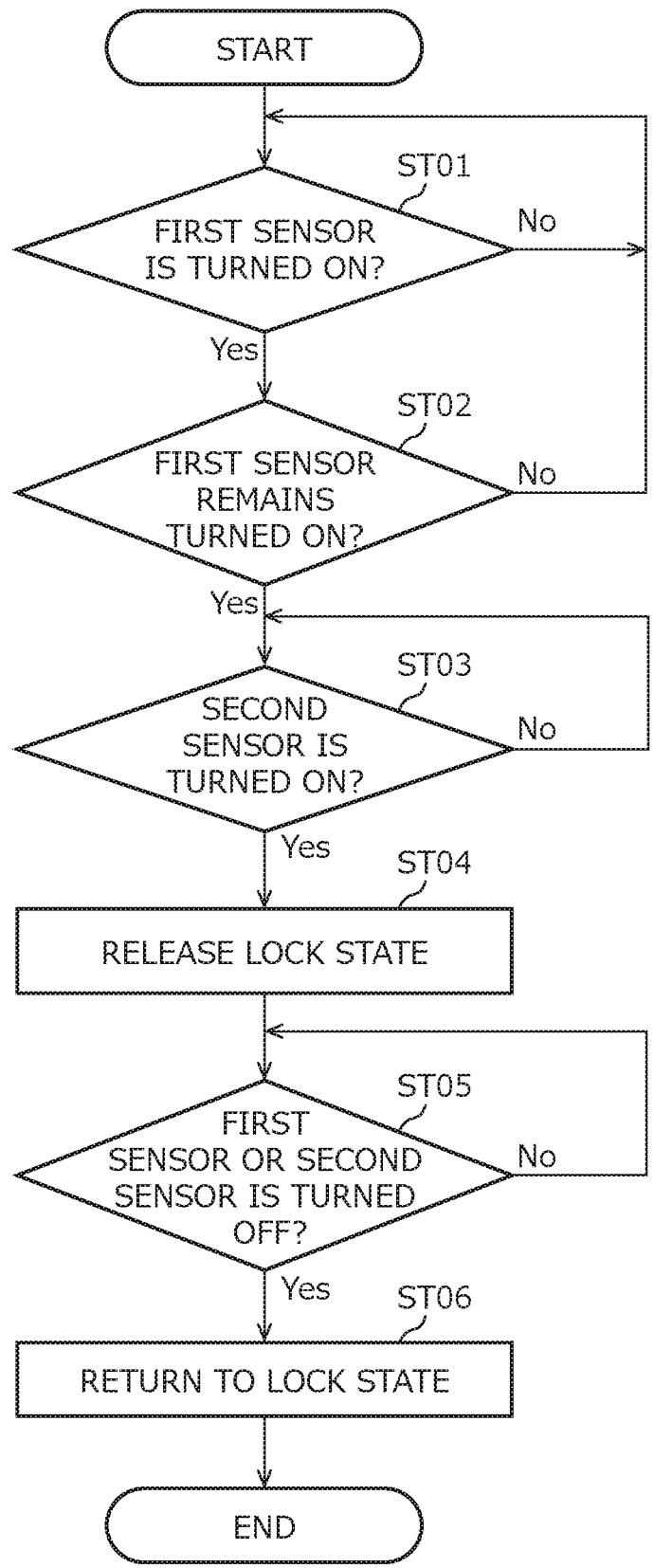
FIG. 19 is a flowchart of an example method of control by the side support device.

A description is now given of a second embodiment of the vehicle seat based on FIG. 17 to FIG. 19. It should be noted that features redundant with the vehicle seat S described above are omitted. The vehicle seat S2 according to the second embodiment includes the seat main body SB, the side support device 30 configured to support the cushion side portion 10 of the seat main body SB to be switchable and moved between the seating available position and the vehicle exit assist position, the lock device 40 that locks the cushion side portion 10 in the seating available position as shown in FIG. 17, and an operation control device 150 that carries out such operation control as to release the lock state of the lock device 40 as shown in FIG. 18. In other words, the operation control device 150 is attached in place of the lock release device 50. The operation control device 150 includes a first sensor 160 that detects the sitting of the occupant on the cushion center portion 15 and a second sensor 170 that detects the sitting of the occupant on the cushion side portion 10 as the vehicle exit behavior as shown in FIG. 17 and FIG. 18. When the operation control device 150 receives a detection signal from the second sensor 170 while receiving a detection signal from the first sensor 160, the operation control device 150 carries out such control as to release the lock state. It should be noted that the operation control device 150 corresponds to the operation device, and the first sensor 160 and the second sensor 170 respectively correspond to the first detector and the second detector.

The operation control device 150 corresponds to an ECU (Electronic Control Unit), is a center function that comprehensively carries out electric control, and includes a drive circuit 151 that respectively supplies drive power to the side support device 30 (lock device 40), and a vehicle body power supply 152 that is connected to the side support device 30 (lock device 40) via the drive circuit 151 as shown in FIG. 18. The operation control device 150 provides such control that the drive circuit 151 controls the drive power supplied to the side support device 30, and controls a current to an electromagnetic clutch, not shown, to be turned on or off, thereby maintaining or releasing the lock state of the lock device 40, for example.

Moreover, the operation control device 150 is respectively connected to the first sensor 160, the second sensor 170, and a child seat detection sensor 180 that is provided in the seat main body SB, and detects attachment of a child seat, not shown, to the seat main body SB. The operation control device 150 receives detection signals input from these respective sensors, and controls the side support device 30 (lock device 40) in the configuration described above.

As an example of the control of the operation control device 150, a description will now be given of the control of releasing the lock state of the lock device 40 when the detection signal is received from the second sensor 170 while the detection signal from the first sensor 160 is being received based on FIG. 19. Processing of a flowchart in FIG. 19 is repeated while an ignition switch of the vehicle is being turned on, for example.

When the processing of the flowchart in FIG. 19 starts, first, it is determined whether or not the first sensor 160 is turned on in Step 01 (ST01). If the first sensor 160 is not turned on (No in ST01), an occupant is not sitting on the vehicle seat S2, and ST01 is thus repeated until an occupant seats.

If the first sensor 160 is turned on (Yes in ST01), it is further determined whether or not the first sensor 160 remains turned on in ST02. If the first sensor 160 does not remain turned on (No in ST02), the processing returns to ST01 in order to confirm that an occupant is sitting again. Thereby, the lock state of the lock device 40 can be released in accordance with the series of behavior of the occupant from the sitting to the vehicle exit.

If the first sensor 160 remains turned on (Yes in ST02), it is further determined whether or not the second sensor 170 is turned on in ST03. If the second sensor 170 is not turned on (No in ST03), it is assumed that the sitting occupant does not move the body toward the door side to try to exit from the vehicle, and ST03 is repeated until the occupant tries to exit from the vehicle.

If the second sensor 170 is turned on (Yes in ST03), it is assumed that the sitting occupant moves his/her body toward the door side to try to exit from the vehicle, and the side support device 30 is operated, thereby releasing the lock state of the lock device 40 in ST04. Consequently, when the occupant further moves his/her body toward the door side to try to exit from the vehicle, the cushion side portion 10 together with the side support 30 is switched from the seating available position to the vehicle exit assist position as a result of further application of the sitting load on the cushion side portion 10. As a result, a load imposed on the exiting occupant who is moving over the cushion side portion 10 can be decreased.

After the release of the lock device 40, it is determined whether or not the first sensor 160 or the second sensor 170 is switched from the on state to the off state in ST05. If the first sensor 160 or the second sensor 170 is not switched to off (No in ST05), it is assumed that the occupant has not completed the vehicle exit behavior, and ST05 is repeated.

If the first sensor 160 or the second sensor 170 is switched to off (Yes in ST05), it is assumed that the occupant has completed the vehicle exit behavior, and the side support device 30 is operated to return the lock device 40 to the lock state in ST06. After the proceeding from ST01 to ST06, the processing in FIG. 19 is finished.

As a result of the series of processing flow described above, the side support device 30 can assist the vehicle exit behavior of the occupant while the hold property for the sitting occupant is stably secured. Moreover, there is provided such a configuration that the cushion side portion 10 is intentionally prevented from inclining during the vehicle entrance behavior of the occupant, and such a consideration that the occupant can surely enter the vehicle is provided.

It should be noted that if the operation control device 150 has received a detection signal from the child seat detection sensor 180 in advance before the processing flow, there is provided such a configuration that the side support device 30 is controlled so that the cushion side portion 10 cannot be switched. As a result, when the child seat, not shown, is attached, a safety lock can be applied for an infant or a child in advance.

Other Embodiment

In the embodiments described above, though the cushion side portion 10 can move between the seating available state shown in FIG. 3 and the vehicle exit assist state where the cushion material 12 is recessed downward as shown in FIG. 8, the vehicle exit assist state is not particularly limited, and may be changed. For example, the cushion material 12 may be recessed to be stored in a backward portion of the seat, or the cushion material 12 may partially be recessed downward as long as the state where the occupant easily exit the vehicle is brought about.

In the embodiments described above, the cushion side portion 10 is configured to move from the seating available position to the vehicle exit assist position as the sitting load of the occupant moves after the lock state of the lock device 40 is released. However, the cushion side portion 10 is not limited to this configuration, and there may be provided such a structure that the cushion side portion automatically moves from the seating available position to the vehicle exit assist position.

In the embodiments described above, the side support device 30 is configured as the device that can assist the vehicle exit behavior of the occupant, but the behavior to be assisted is not particularly limited, and the side support device may be configured as a device that can assist the vehicle entrance behavior and the vehicle exit behavior of the occupant. In this case, a movement amount of the cushion side portion 10 by the side support device 30 in the vehicle entrance behavior of the occupant is more preferably less than that in the vehicle exit behavior. Moreover, the side support device 30 may be configured as a device capable of only assisting the vehicle entrance behavior of the occupant.

In the embodiments described above, the side support device 30 (lock release device 50) is arranged in the cushion side portion 10 of the seat main body SB, but the arrangement is not particularly limited, and the side support device 30 only needs to be arranged in a side section of the seat main body SB in the seat widthwise direction. The side section includes a side section of the cushion center portion 15 in addition to the cushion side portion 10, for example.

In the embodiments described above, the lock release device 50 is configured so that the lock state is released when the first lock release lever 51 and the second lock release lever 54 move to the lock release positions in this sequence, but the sequence is not particularly limited, and may be changed. For example, the lock may be released when the first lock release lever 51 and the second lock release lever 54 simultaneously move to the lock release positions, or the lock may be released when the second lock release lever 54 and the first lock release lever 51 move to the lock release positions in this sequence.

In the embodiment described above, the first lock release lever 51 is arranged in the cushion center portion 15, the second lock release lever 54 is arranged in the cushion side portion 10, the first lock release lever 51 and the second lock release lever 54 are respectively outside in the right and left direction with respect to the center side of the seat main body SB in the right and left direction, and are arranged outside the anchor member 2*c* attached to the seat main body SB in the right and left direction as shown in FIG. 1, but the arrangement is not particularly limited, and may be changed. For example, the first lock release lever 51 may be arranged in a predetermined position in the seat cushion 1 or the seatback 2, and the second lock release lever 54 may be arranged in a predetermined position in the vehicle door D. Moreover, the first lock release lever 51 may be attached to a seat belt device, not shown, and may be provided to operate in accordance with an unfastening operation of the seat belt, and the second lock release lever 54 may be attached to a predetermined position for a vehicle door, and may be provided to operate in accordance with the opening/closing operation of the door, for example.

Figure 20:
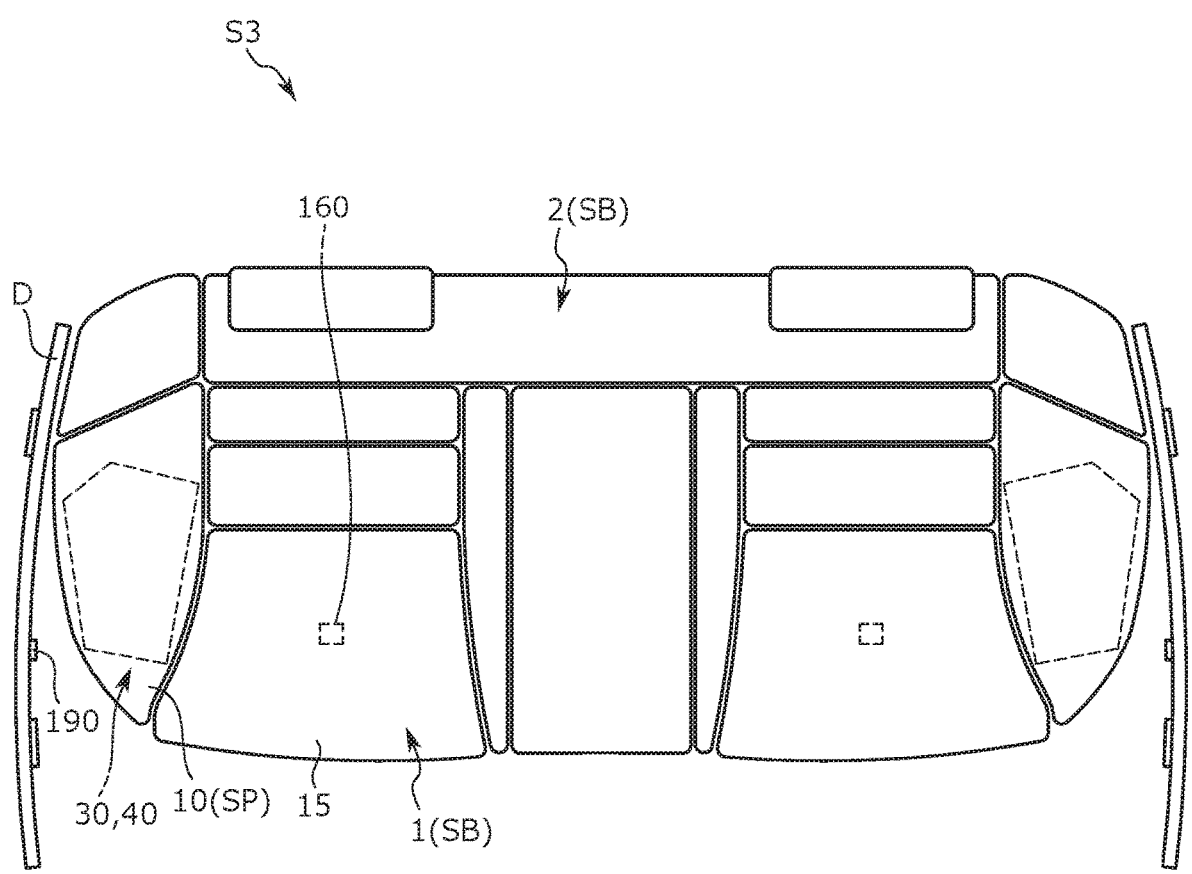
FIG. 20 is a top view of an appearance of the vehicle seat according to a third embodiment.

In the embodiments described above, as shown in FIG. 17, the operation control device 150 includes the first sensor 160 that detects the sitting of the occupant on the cushion center portion 15 and the second sensor 170 that detects the sitting of the occupant on the cushion side portion 10 as the vehicle exit behavior as shown in FIG. 17, but the sensors are not particularly limited, and may be changed. For example, the operation control device 150 may include a second door sensor 190 that is attached to the vehicle door D, and detects the opening of the vehicle door D as the vehicle exit behavior of the occupant in place of the second sensor 170 as shown in FIG. 20. Moreover, the operation control device 150 may include a second handle sensor that detects a turn of an inner handle of the vehicle door D as the vehicle exit behavior of the occupant in place of the second sensor 170, for example. In other words, the second sensor may appropriately be changed as long as the second sensor detects the state change of a detection subject that changes in the state in accordance with the vehicle exit behavior of the occupant.

In the embodiments described above, a description is given of the vehicle seat that is used for a motor vehicle, and can be stored as a specific example, the vehicle seat is not limited to this seat, and the vehicle seat may be used as a vehicle seat for a train, a bus, and the like as well as a conveyance seat for an airplane, a ship, and the like.

In the embodiment described above, a description is mainly given of the vehicle seat S according to the present disclosure. However, the embodiment is simply an example for promoting understanding of the present disclosure, and do not limit the present disclosure. It should be understood that the present disclosure can be change and improved without departing from the gist thereof, and the present disclosure includes equivalences thereof.

TABLE OF REFERENCE NUMERALS

S: Vehicle seat
SB: Seat main body

SP: Side portion
1: Seat cushion
1a, 2a: Cushion material
1b, 2b: Skin material
2: Seatback
2c: Anchor member
10: Cushion side portion (side portion)
11: Side frame
12: Cushion material
13: Skin material
15: Cushion center portion
20: Back side portion
30: Side support device
31: Side plate
31a: Through hole
31b: Sidewall portion
32: Side bracket
32a: Top wall portion
32b: Sidewall portion
33: Rotation shaft
34: Side base
34a: Bottom wall portion
34b: Sidewall portion
35: Side wire
40: Lock device
41: Lock lever
41a: Engagement protrusion
41b: Held portion
41c: Through protrusion
42: Support shaft
43: Locked lever
43a: Engagement groove
44: Fixing bolt
50: Lock release device (operation device)
51: First lock release lever (first detector, first lock release member)
52, 55: Turn shaft
53: First transmission cable
53a: Cable attachment end portion
54: Second lock release lever (second detector, second lock release member)
56: Second transmission cable
56a: Cable attachment end portion
60: First transmission lever
60a: Attachment hole
60b: Through hole
61: First coupling shaft
70: Second transmission lever
70a: Attachment hole
70b: Through hole
71: Second coupling shaft
72: Press lever
72a: Through protrusion
72b: Press portion
73: Coupling pin
80: Relay lever
80a: Fit protrusion
80b: Press reception portion
80c: Hold portion
150: Operation control device (operation device)
151: Drive circuit
152: Vehicle body power supply
160: First sensor (first detector)
170: Second sensor (second detector)
180: Child seat detection sensor
190: Second door sensor (second detector)
D: Vehicle door

The invention claimed is:

1. A vehicle seat, comprising:
a seat main body on which an occupant can be seated; and
a side support device configured to support a cushion side portion of the seat main body in a seat widthwise direction to be switchable between a seating available state where the occupant can be seated and a vehicle exit assist state where a vehicle exit behavior of the occupant is assisted, wherein the vehicle seat comprises:
a first detector configured to detect sitting of the occupant on the seat main body;
a second detector configured to detect a state change in a detection subject that changes state in accordance with the vehicle exit behavior of the occupant; and
an operation device configured to operate the side support device so that the cushion side portion is switched from the seating available state to the vehicle exit assist state when the second detector detects the state change in the detection subject after the first detector starts detecting the sitting of the occupant,
wherein:
the side support device comprises a lock device configured to lock the cushion side portion in the seating available state;
the operation device is a lock release device configured to release a lock state of the lock device;
the first detector is a first lock release lever;
the second detector is a second lock release lever;
the first detector and the second detector are respectively inclined relative to a horizontal surface when the cushion side portion is in the seating available state;
the second detector is inclined diagonally upward and outward in the seat widthwise direction when the cushion side portion is in the seating available state;
the first detector is inclined diagonally upward and inward in the seat widthwise direction when the cushion side portion is in the seating available state; and
the operation device is configured to operate the side support device to release the lock state of the lock device when an operation by the second lock release lever occurs after the first lock release lever starts an operation.

2. The vehicle seat according to claim 1, wherein the operation device is configured to operate the side support device when the detection by the second detector occurs while the first detector continues to detect the sitting of the occupant.

3. The vehicle seat according to claim 1, wherein:
the first detector is arranged in a center portion in the seat widthwise direction in the seat main body; and
the second detector is arranged in the cushion side portion in the seat main body.

4. The vehicle seat according to claim 3, wherein the second detector detects sitting of the occupant on the cushion side portion as the vehicle exit behavior of the occupant.

5. The vehicle seat according to claim 4, wherein an area of the first detector for receiving a sitting load imposed by the occupant is larger than an area of the second detector for receiving the sitting load imposed by the occupant.

6. The vehicle seat according to claim 1, wherein:
the seat main body comprises a seat cushion that serves as a sitting portion;
the side support device is configured to support the cushion side portion of the seat cushion to be switchable; and the first detector and the second detector are respectively arranged in a center portion in a seat front to back direction in the seat cushion.

7. The vehicle seat according to claim 1, further comprising a child seat detector configured to detect an attachment of a child seat to the seat main body, wherein the operation device is configured to operate the side support device so that the cushion side portion cannot be switched when the detection by the child seat detector occurs.

8. The vehicle seat according to claim 1, wherein:
an anchor member that attaches an attached portion provided for the child seat is provided in the seat main body; and
the first detector and the second detector are respectively arranged outside the anchor member in the seat widthwise direction in the seat main body.

9. The vehicle seat according to claim 1, wherein:
the first detector is arranged below the second detector when the cushion side portion is in the seating available state; and
the first detector is arranged above the second detector when the cushion side portion is in the vehicle exit assist state.

10. The vehicle seat according to claim 1, wherein:
the side support device rotationally moves so that the cushion side portion moves in a top to bottom direction.

11. The vehicle seat according to claim 1, wherein:
the first detector and the second detector are configured to rotate respectively.

12. The vehicle seat according to claim 1, wherein:
the cushion side portion comprises a cushion material; and
the second detector is arranged below the cushion material.

13. The vehicle seat according to claim 1, wherein:
the side support device comprises a side plate that is configured to support the cushion side portion from below; and
one of the first detector and the second detector is arranged on the side plate.

14. The vehicle seat according to claim 1, wherein:
the first detector is longer than the second detector in the seat widthwise direction and in a seat front to back direction.

15. The vehicle seat according to claim 1, wherein:
the side support device comprises a side plate that is configured to support the cushion side portion from below;
a through hole passing through the side plate in a top to bottom direction is provided on a top surface of the side plate; and
the second detector is provided to pass through the through hole, and is longer than the through hole in a seat front to back direction.

* * * * *